United States Patent
Nitta et al.

(10) Patent No.: US 11,468,065 B2
(45) Date of Patent: Oct. 11, 2022

(54) INFORMATION PROCESSING APPARATUS, INFORMATION PROCESSING METHOD, AND NON-TRANSITORY COMPUTER-READABLE RECORDING MEDIUM

(71) Applicant: YAHOO JAPAN CORPORATION, Tokyo (JP)

(72) Inventors: Kiyoshi Nitta, Tokyo (JP); Iztok Savnik, Koper (SI)

(73) Assignee: YAHOO JAPAN CORPORATION, Tokyo (JP)

( * ) Notice: Subject to any disclaimer, the term of this patent is extended or adjusted under 35 U.S.C. 154(b) by 242 days.

(21) Appl. No.: 16/281,414

(22) Filed: Feb. 21, 2019

(65) Prior Publication Data
US 2019/0384761 A1    Dec. 19, 2019

(30) Foreign Application Priority Data

Jun. 13, 2018    (JP) ............................. JP2018-112653

(51) Int. Cl.
*G06F 16/2455*    (2019.01)
*G06F 16/28*      (2019.01)

(52) U.S. Cl.
CPC ........ *G06F 16/2455* (2019.01); *G06F 16/285* (2019.01)

(58) Field of Classification Search
CPC .................. G06F 16/2455; G06F 16/285

USPC ........................................................ 707/737
See application file for complete search history.

(56) References Cited

U.S. PATENT DOCUMENTS

| 11,042,548 B2 * | 6/2021 | Griffith ............... G06F 16/2379 |
| 2014/0304251 A1 * | 10/2014 | Bornea ............. G06F 16/24542 |
| | | 707/718 |
| 2019/0087724 A1 * | 3/2019 | Park ......................... G06N 5/02 |

FOREIGN PATENT DOCUMENTS

JP    6282714 B1    2/2018

* cited by examiner

*Primary Examiner* — Joshua Bullock
(74) *Attorney, Agent, or Firm* — Oliff PLC

(57) ABSTRACT

An information processing apparatus according to the present application includes an acquiring unit and a selecting unit. The acquiring unit acquires a plurality of pieces of second triple information hierarchized based on a conceptual system in a plurality of pieces of first triple information indicating a relationship about three types of elements and statistical information indicating the number of pieces of the first triple information associated with each of the plurality of pieces of the second triple information. The selecting unit selects, based on the statistical information acquired by the acquiring unit and based on a predetermined standard related to the statistical information, from among the plurality of pieces of the second triple information, a plurality of pieces of target triple information to be used for a clustering process.

21 Claims, 18 Drawing Sheets

FIG.2
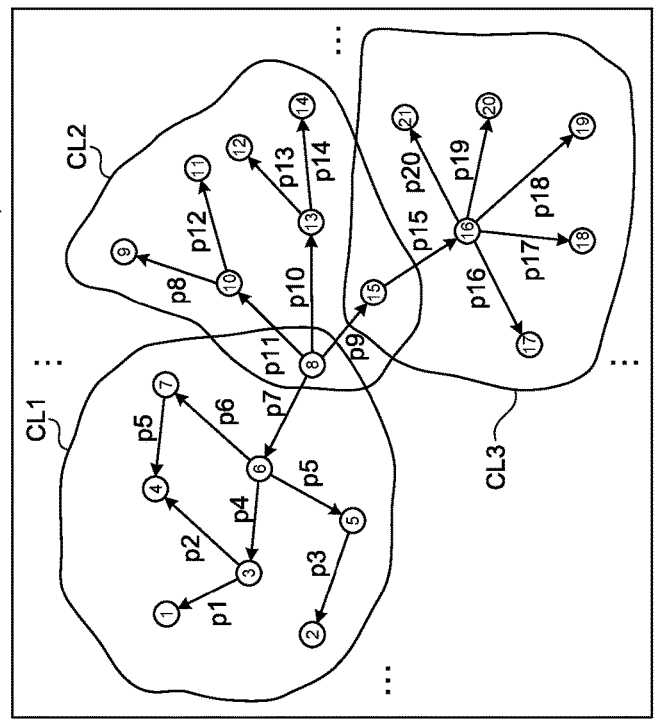
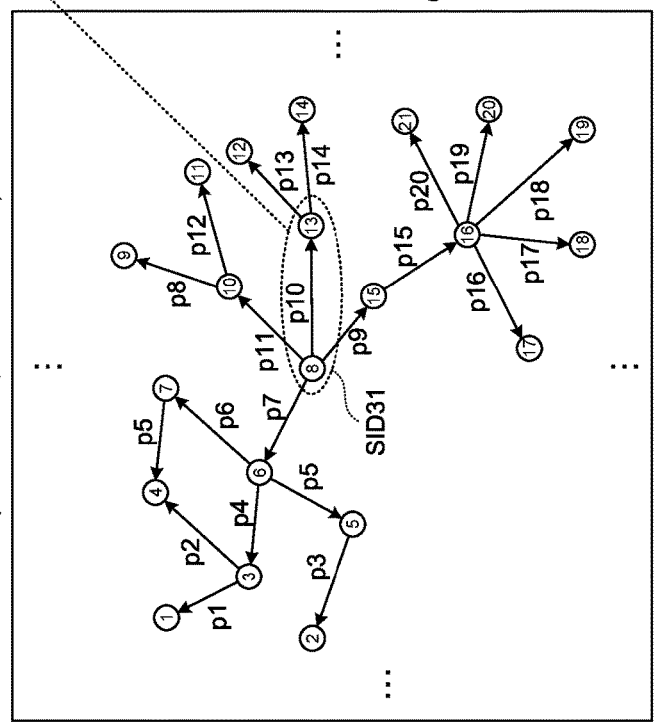

FIG.5

| FIRST TRIPLE ID | Subject | Predicate | Object | ... |
|---|---|---|---|---|
| ... | ... | ... | ... | ... |
| FID11 | <Jim> | <worksAt> | <HOGE.inc> | ... |
| ... | ... | ... | ... | ... |
| FID21 | <Jim> | <hasAge> | 32 | ... |
| ... | ... | ... | ... | ... |
| FID201 | <Tom> | <plays> | <football> | ... |
| ... | ... | ... | ... | ... |
| FID1105 | <Abbie> | <livesIn> | <Texas> | ... |
| ... | ... | ... | ... | ... |
| ... | ... | ... | ... | ... |

FIG.6

| SECOND TRIPLE ID | Subject | Predicate | Object | HIERARCHY INFORMATION | | | STATISTICAL INFORMATION | | |
|---|---|---|---|---|---|---|---|---|---|
| | | | | HIGHER LEVEL 1 | HIGHER LEVEL 2 | ... | HIER-ARCHY | COUNT VALUE | ... |
| SID1 | <owl:Thing> | <rdf:Property> | <owl:Thing> | – | – | ... | 0 | 100000 | ... |
| ... | ... | ... | ... | ... | ... | ... | ... | ... | ... |
| SID11 | <person> | <worksAt> | <organization> | SID1 | – | ... | X | 10000 | ... |
| ... | ... | ... | ... | ... | ... | ... | ... | ... | ... |
| SID21 | <person> | <worksAt> | <company> | SID11 | SID15 | ... | X+1 | 1500 | ... |
| SID22 | <employee> | <worksAt> | <organization> | SID11 | – | ... | X+1 | 1200 | ... |
| ... | ... | ... | ... | ... | ... | ... | ... | ... | ... |
| SID31 | <employee> | <worksAt> | <company> | SID21 | SID22 | ... | X+2 | 500 | ... |
| SID32 | <engineer> | <worksAt> | <organization> | SID22 | – | ... | X+2 | 200 | ... |
| ... | ... | ... | ... | ... | ... | ... | ... | ... | ... |
| SID41 | <engineer> | <worksAt> | <company> | SID31 | SID32 | ... | X+3 | 80 | ... |
| ... | ... | ... | ... | ... | ... | ... | ... | ... | ... |

| ONTOLOGY ID | Subject | Predicate | Object | ... |
|---|---|---|---|---|
| ... | ... | ... | ... | ... |
| TID101 | <worksAt> | rdfs:domain | <person> | ... |
| TID102 | <worksAt> | rdfs:range | <organization> | ... |
| ... | ... | ... | ... | ... |
| TID201 | <ceo> | rdfs:subClassOf | <officer> | ... |
| TID202 | <father> | rdfs:subClassOf | <parent> | ... |
| ... | ... | ... | ... | ... |
| TID211 | <officer> | rdfs:subClassOf | <owner> | ... |
| TID212 | <officer> | rdfs:subClassOf | <engineer> | ... |
| ... | ... | ... | ... | ... |
| TID221 | <owner> | rdfs:subClassOf | <person> | ... |
| TID222 | <engineer> | rdfs:subClassOf | <employee> | ... |
| ... | ... | ... | ... | ... |
| TID231 | <employee> | rdfs:subClassOf | <person> | ... |
| ... | ... | ... | ... | ... |
| TID301 | <commercial company> | rdfs:subClassOf | <company limited> | ... |
| ... | ... | ... | ... | ... |
| TID311 | <company limited> | rdfs:subClassOf | <company> | ... |
| ... | ... | ... | ... | ... |
| TID321 | <company> | rdfs:subClassOf | <organization> | ... |
| ... | ... | ... | ... | ... |
| TID501 | <Jim> | rdf:type | <ceo> | ... |
| TID502 | <Jim> | rdf:type | <father> | ... |
| ... | ... | ... | ... | ... |
| TID505 | <HOGE.inc> | rdf:type | <commercial company> | ... |
| ... | ... | ... | ... | ... |

| TARGET TRIPLE ID (SECOND TRIPLE ID) | Subject (NODE ID) | Predicate (EDGE ID) | Object (NODE ID) | STATISTICAL INFORMATION | | ... |
|---|---|---|---|---|---|---|
| | | | | COUNT VALUE | ... | |
| ... | ... | ... | ... | ... | ... | ... |
| SID25 | <company> (N13) | <belongsTo> (p14) | ... | 900 | ... | ... |
| ... | ... | ... | ... | ... | ... | ... |
| SID31 | <employee> (N8) | <worksAt> (p10) | <company> (N13) | 500 | ... | ... |
| SID32 | <engineer> (N16) | <worksAt> (p20) | <organization> (N21) | 200 | ... | ... |
| ... | ... | ... | ... | ... | ... | ... |
| SID55 | ... | ... | <engineer> (N16) | 350 | ... | ... |
| ... | ... | ... | ... | ... | ... | ... |

| EDGE ID (PREDICATE EDGE) | NODE ID | | ... |
|---|---|---|---|
| | SUBJECT NODE (LINK SOURCE) | OBJECT NODE (LINK DESTINATION) | |
| p1 | N3 | N1 | ... |
| ... | ... | ... | ... |
| p10 | N8 | N13 | ... |
| ... | ... | ... | ... |
| p14 | N13 | N14 | ... |
| ... | ... | ... | ... |
| p20 | N16 | N21 | ... |
| ... | ... | ... | ... |

FIG.14
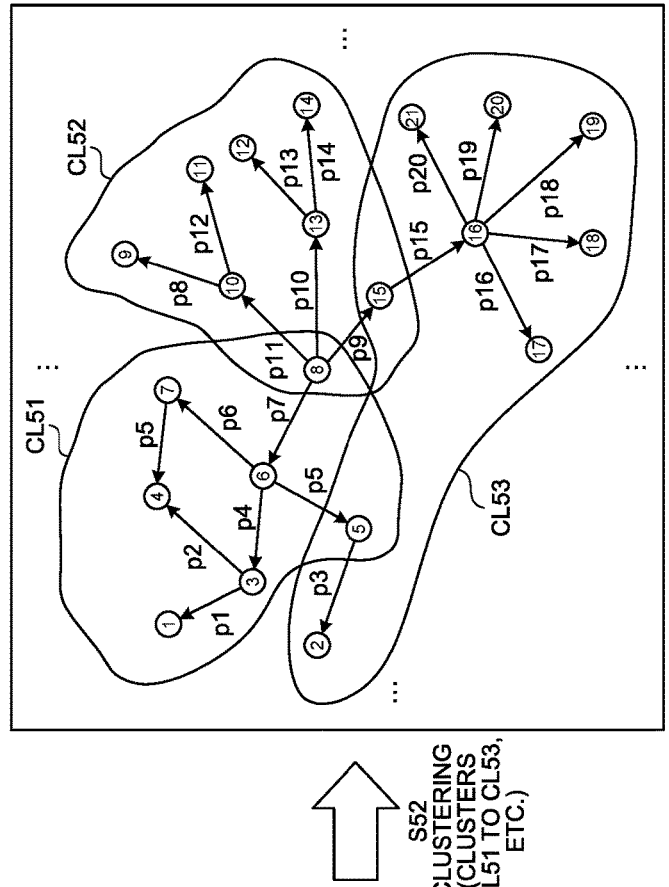
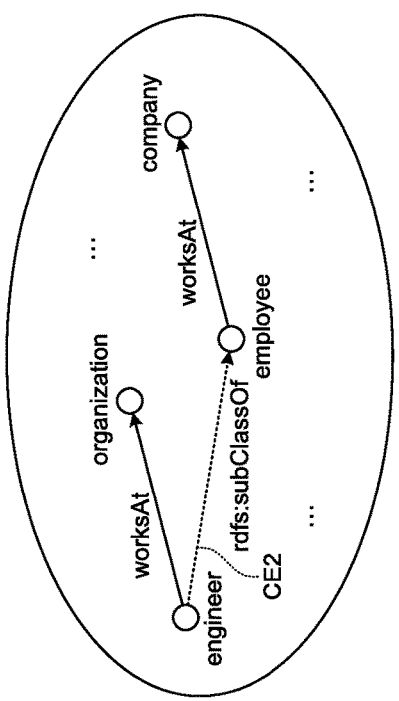
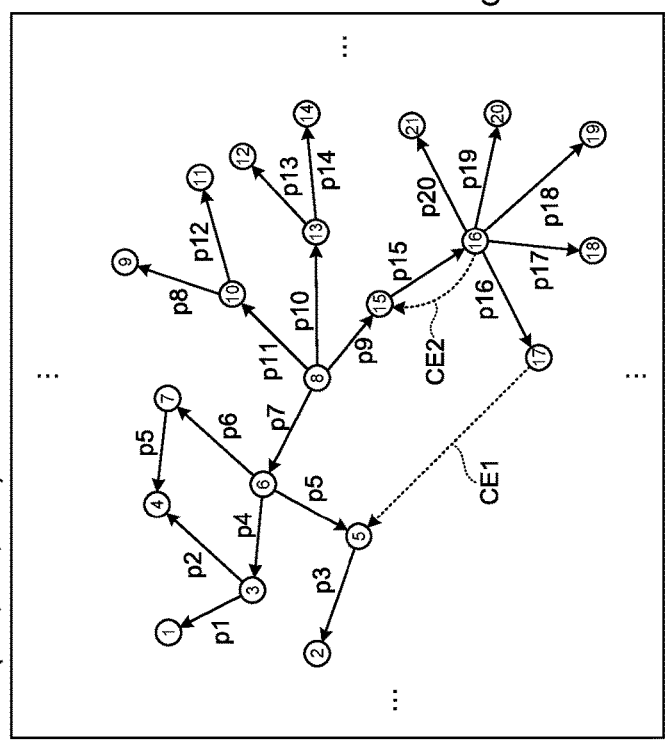

INFORMATION PROCESSING APPARATUS, INFORMATION PROCESSING METHOD, AND NON-TRANSITORY COMPUTER-READABLE RECORDING MEDIUM

CROSS-REFERENCE TO RELATED APPLICATION(S)

The present application claims priority to and incorporates by reference the entire contents of Japanese Patent Application No. 2018-112653 filed in Japan on Jun. 13, 2018.

BACKGROUND OF THE INVENTION

1. Field of the Invention

The present invention relates to an information processing apparatus, an information processing method, and a non-transitory computer-readable recording medium.

2. Description of the Related Art

Conventionally, the Resource Description Framework (RDF) is known as the framework of describing resources in a network. Furthermore, in the RDF data model, three elements of the subject, the predicate, and the object referred to as triple represent the relationship in the resources. For example, there is a provided technology of allowing a conceptual system in a plurality of pieces of triple information to be statistically grasped because an amount of triple data (triple information) with respect to graph data that is encoded as triple and that is stored is huge.

Patent Document 1: Japanese Patent No. 6282714

However, with the conventional technology described above, the triple information is not always able to be classified. For example, division management is needed in order to efficiently use the triple information; however, with an existing clustering method, a calculating machine cost needed for division becomes huge. Furthermore, when the triple information is divided, use efficiency is more increased in a case in which pieces of triple information having closer relationship are collected as a single division unit (cluster). For example, by only statistically grasping the conceptual system in the plurality of pieces of triple information, the usage thereafter is not considered and thus a method of using the information is to be solved. In this way, with the conventional technology described above, it is not always possible to appropriately classify and efficiently use the triple information.

SUMMARY OF THE INVENTION

It is an object of the present invention to at least partially solve the problems in the conventional technology.

According to one aspect of an embodiment, an information processing apparatus includes an acquiring unit that acquires a plurality of pieces of second triple information hierarchized based on a conceptual system in a plurality of pieces of first triple information indicating a relationship about three types of elements and statistical information indicating the number of pieces of the first triple information associated with each of the pieces of the second triple information; and a selecting unit that selects, based on the statistical information acquired by the acquiring unit and based on a predetermined standard related to the statistical information, from among the plurality of pieces of the second triple information, a plurality of pieces of target triple information to be used for a clustering process.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating an example of the information processing according to the embodiment;

FIG. 5 is a diagram illustrating an example of a first triple information storage unit according to the embodiment;

FIG. 6 is a diagram illustrating an example of a second triple information storage unit according to the embodiment;

FIG. 7 is a diagram illustrating an example of an ontology information storage unit according to the embodiment;

FIG. 8 is a diagram illustrating an example of a target triple information storage unit according to the embodiment;

FIG. 9 is a diagram illustrating an example of a graph information storage unit according to the embodiment;

FIG. 14 is a diagram illustrating clustering according to the embodiment;

DETAILED DESCRIPTION OF THE PREFERRED EMBODIMENTS

Figure 1:
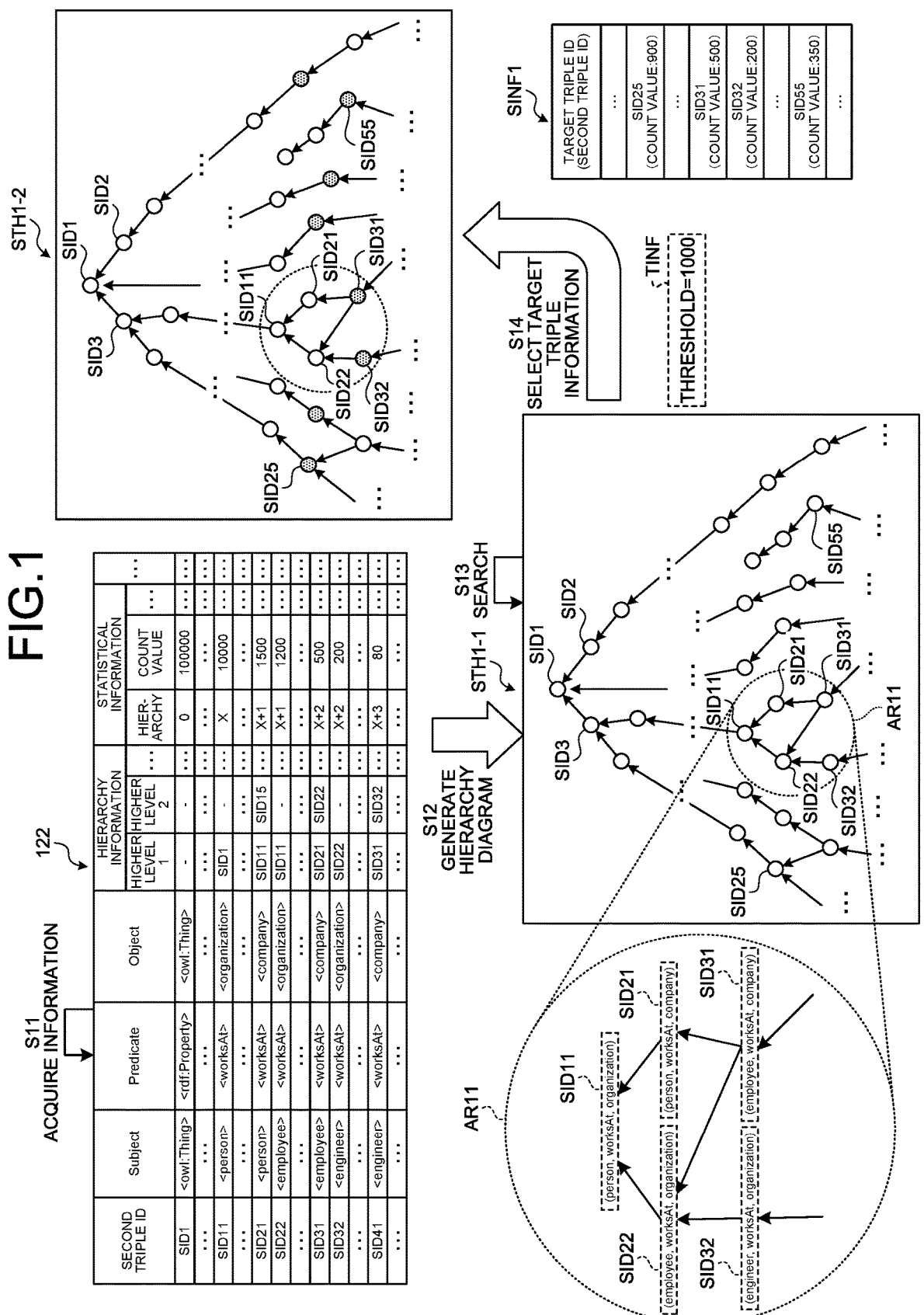
FIG. 1 is a diagram illustrating an example of information processing according to an embodiment.

A mode (hereinafter, referred to as an "embodiment") for carrying out an information processing apparatus, an information processing method, and a non-transitory computer-readable recording medium having stored therein an information processing program according to the present application will be described in detail below with reference to the accompanying drawings. The information processing apparatus, the information processing method, and the information processing program according to the present application are not limited by embodiment. Furthermore, in the embodiments below, the same components are denoted by the same reference numerals and an overlapping description will be omitted.

Embodiment

1. Information Processing

An example of information processing according to the embodiment will be described with reference to FIG. 1 and FIG. 2. FIG. 1 and FIG. 2 are diagrams each illustrating an example of the information processing according to the embodiment. FIG. 1 and FIG. 2 each illustrates a case in which an information processing apparatus 100 (see FIG. 4) performs a clustering process based on statistical information related to second triple information stored in a second triple information storage unit 122. Furthermore, the triple information mentioned here is information that is based on a data model of the Resource Description Framework (RDF) and that represents the relationship, in the resources, among three elements (triple) of a subject, a predicate, and an object. Furthermore, in the embodiment, the triple information stored in a first triple information storage unit 121 is sometimes referred to as first triple information, the triple information stored in the second triple information storage unit 122 is sometimes referred to as the second triple information, and the triple information stored in an ontology information storage unit 123 is sometimes referred to as ontology information. First, descriptions of the first triple information storage unit 121, the second triple information storage unit 122, the ontology information storage unit 123, and the like will be described. Furthermore, in a description below, a description of "< >" is sometimes and appropriately omitted.

For example, in the first triple information storage unit 121 (see FIG. 5), a triple information group that is calculation target of the statistical information and that is a target of clustering is stored. Here, if "first triple information FID* (* is an arbitrary numerical value)" is described, the first triple information indicates the triple information identified by the first triple ID "FID*". For example, if the "first triple information FID21" is described, this triple information is the triple information (the first triple information) that is identified by the first triple ID "FID21".

For example, the first triple information storage unit 121 illustrated in FIG. 5 includes items, such as "first triple ID", "Subject", "Predicate", "Object", and the like.

The "first triple ID" indicates the identification information for identifying the triple information. The "Subject" indicates the value associated with the subject included in the triple information identified by the first triple ID. Furthermore, the "Predicate" indicates the value associated with the predicate included in the triple information identified by the first triple ID. Furthermore, the "Object" indicates the value associated with the object included in the triple information identified by the first triple ID.

In the example illustrated in FIG. 5, the first triple information FID11 indicates that the subject is "<Jim>", i.e., a predetermined person "Jim". Furthermore, in the example illustrated in FIG. 5, the first triple information FID11 indicates that the predicate is "<worksAt>", i.e., the predicate having the meaning of "works at". Furthermore, in the example illustrated in FIG. 5, the first triple information FID11 indicates that the object is "<HOGE.inc>", i.e., a predetermined company "HOGE, Inc.".

The example illustrated in FIG. 1 indicates an example in which the information processing apparatus 100 calculates, for each of the pieces of the second triple information, statistical information targeted for the first triple information such as that described above and performs clustering on the second triple information based on the statistical information. The information processing apparatus 100 calculates the statistical information for each of the pieces of the second triple information based on the information related to, for example, the definition of each entity (substance) or the like in a predetermined ontology (conceptual system) stored in the ontology information storage unit 123 (see FIG. 7). For example, the second triple information is schema information indicating conceptual classification structure that is based on the ontology information stored in the ontology information storage unit 123. For example, the second triple information is the information indicating the semantic conceptual structure (graph structure) between the pieces of the triple information based on the ontology information stored in the ontology information storage unit 123. Furthermore, a description about extracting (generating) the second triple information and calculating statistical information will be described in detail later. In the following, a description will be given with the assumption that the second triple information and the statistical information thereof described above have been generated.

1-1. Selecting Target Triple Information

First, the information processing apparatus 100 acquires information (Step S11). The information processing apparatus 100 acquires the second triple information indicated by the second triple information storage unit 122 illustrated in FIG. 1. The information processing apparatus 100 may also acquire the second triple information from a storage unit 120 (see FIG. 4) or may also acquire the second triple information from an information providing device 50 (see FIG. 3).

The second triple information storage unit 122 illustrated in FIG. 1 includes items, such as "second triple ID", "Subject", "Predicate", "Object", "statistical information", and the like. Furthermore, the second triple information storage unit 122 illustrated in FIG. 1 and the second triple information storage unit 122 illustrated in FIG. 6 are the same second triple information storage unit 122 and, in FIG. 1, an illustration of the item "hierarchy information" in the second triple information storage unit 122 is omitted.

The "second triple ID" indicates the identification information for identifying the triple information. Furthermore, "Subject" indicates the value associated with the subject included in the triple information identified by the second triple ID. Furthermore, the "Predicate" indicates the value associated with the predicate included in the triple information identified by the second triple ID. Furthermore, the "Object" indicates the value associated with the object included in the triple information identified by the second triple ID.

Furthermore, the "hierarchy information" includes items, such as "higher level 1", "higher level 2", and the like. For example, the "higher level 1" and the "higher level 2" stores therein the information for identifying the triple information that is associated with a higher level concept (higher level class) of the triple information identified by the second triple ID. Furthermore, in FIG. 6, only the "higher level 1" and the "higher level 2" are illustrated; however, a "higher level 3", a "higher level 4", and the like may also be included such that all of the pieces of the triple information associated with the higher level class of the triple information are stored.

Furthermore, the "statistical information" includes items, such as "hierarchy", "count value", and the like. For example, in the "hierarchy", the hierarchy in the second triple information of the triple information identified by the second triple ID is stored. For example, the "count value"

stores therein the count value of the triple information identified by the second triple ID. For example, the "count value" stores therein the count value that is based on the number of pieces of the first triple information associated with the triple information identified by the second triple ID.

In the example illustrated in FIG. 1, the second triple information storage unit 122 stores therein various kinds of triple information, such as the second triple information SID1 identified by the second triple ID "SID1" and the second triple information SID21 identified by the second triple ID "SID21".

Furthermore, as described above, if the "second triple information SID* (* is an arbitrary numerical value) is described, this indicates that the mentioned second triple information SID is the triple information identified by the second triple information ID "SID*". For example, if the "second triple information SID22" is described, this indicates that the mentioned triple information is the triple information (the second triple information) that is identified by the second triple ID "SID22".

In the example illustrated in FIG. 1, the second triple information SID1 identified by the second triple ID "SID1" indicates that the subject is "<owl:Thing>" and is in the class that is associated with a predetermined class, for example, a set of all individuals. Furthermore, in the example illustrated in FIG. 1, the second triple information SID1 indicates that the predicate is "<rdf:Property>" and is in the class representing a predetermined class, for example, a property. Furthermore, in the example illustrated in FIG. 1, the second triple information SID1 indicates that the object is "<owl:Thing>" and is in the class associated with, a predetermined class, for example, a set of all individuals. For example, the second triple information SID1 is the triple information associated with abstract meaning (structure) indicating that "something has a relationship with something".

Furthermore, the second triple information SID1 indicates that the second triple information in the higher level hierarchy is not present. Furthermore, the second triple information SID1 indicates that the hierarchy is a "0" hierarchy and the number of counts is "100000". For example, the second triple information SID1 is the top level hierarchy and is the second triple information that does not have abstract second triple information on an upper level thereof. In the example illustrated in FIG. 1, the second triple information SID1 is the triple information that corresponds to the higher level concept of all of the other pieces of the second triple information and that is associated with the abstract meaning of the top level.

In the example illustrated in FIG. 1, the second triple information SID11 identified by the second triple ID "SID11" indicates that the subject is "<person>", i.e., a person. Furthermore, in the example illustrated in FIG. 1, the second triple information SID11 indicates that the predicate is "<worksAt>", i.e., the predicate having the meaning of "works at". Furthermore, in the example illustrated in FIG. 1, the second triple information SID11 indicates that the object is "<organization>", i.e., an organization. In this way, in the example illustrated in FIG. 1, the second triple information SID11 is the triple information associated with the abstract meaning indicating that "a person works at an organization".

Furthermore, the second triple information SID11 indicates that the second triple information in the higher level hierarchy is the second triple information SID1. Furthermore, the second triple information SID11 indicates that the hierarchy is an "X (X is an arbitrary number)" hierarchy and the number of counts is "10000". For example, the second triple information SID11 is the second triple information in a hierarchy "1" that is immediately below the second triple information SID1 that is present in the top level hierarchy "0".

In the example illustrated in FIG. 1, the second triple information SID41 identified by the second triple ID "SID41" indicates that the subject is "<engineer>", i.e., an engineer. Furthermore, in the example illustrated in FIG. 1, the second triple information SID41 indicates that the predicate is "<worksAt>", i.e., the predicate having the meaning of "works at". Furthermore, in the example illustrated in FIG. 1, the second triple information SID41 indicates that the object is "<company>", i.e., a company. In this way, in the example illustrated in FIG. 1, the second triple information SID41 may also be the triple information associated with abstract meaning indicating that "an engineer works at a company".

Furthermore, the second triple information SID41 indicates that the second triple information in the higher level hierarchy is the second triple information SID31 or the second triple information SID32. Furthermore, the second triple information SID41 indicates that the hierarchy is an "X+3 (X is an arbitrary number)" hierarchy and the number of counts is "80". For example, the second triple information SID41 may also be the second triple information SID31 in a hierarchy "3" or may also be the second triple information in a hierarchy "4" that is immediately below the second triple information SID32.

Then, the information processing apparatus 100 generates a hierarchy diagram indicating hierarchical relationships between the pieces of the second triple information (Step S12). In the example illustrated in FIG. 1, the information processing apparatus 100 generates, based on the information included in the second triple information storage unit 122, a hierarchy diagram STH1-1 indicating the hierarchical relationships between the pieces of the second triple information. The information processing apparatus 100 generates the hierarchy diagram STH1-1 by using the hierarchy information included in the second triple information storage unit 122.

For example, in the hierarchy diagram STH1-1, the connection relationship indicated by each of the arrow lines indicates the relationship of the higher level and the lower level between the pieces of the second triple information. The arrow line that links individual pieces of the second triple information together illustrated in the hierarchy diagram STH1-1 indicates that there is a relationship of a higher level class (higher level concept) and a lower level class (lower level concept) is present between the pieces of linked second triple information. Specifically, the second triple information indicated by "0" on the starting point (the root of the arrow) side of an arrow line is a lower level concept and the second triple information indicated by "0" on the end point (the head of the arrow) side of the arrow line is a higher level concept. Namely, the second triple information positioned at the root of the arrow of an arrow line is associated with a lower level class (lower level concept), whereas the second triple information positioned at the head of the arrow of an arrow line is associated with the higher level class (higher level concept). For example, the second triple information SID1 indicates that the higher level class (higher level concept) of the second triple information SID2 and the second triple information SID3.

In the following, a simple specific example will be described by using an area AR11 illustrated in hierarchy diagram STH1-1 as an example. For example, in the area AR11 illustrate din FIG. 1, the second triple information SID11 that indicates the abstract meaning indicating that "a person works at an organization" is located at the top level concept. For example, in the area AR11 illustrate din FIG. 1, the second triple information SID21 in which the subject is "<person>", the predicate is "<worksAt>", and the object is "<company>" is located at the lower level concept of the second triple information SID11. In this way, in the lower level concept of the second triple information SID11, the second triple information SID21 that has the subject and the predicate, which are common to those of the second triple information SID11, and that has the object of "<company>" that is the lower level class of "<organization>" is located. In RDF, a delimiter character " " (space) is normally used. But, in the embodiment, we use a delimiter character "," in place of the delimiter character " " (space) for visibility. So the delimiter character "," in the embodiment can also be replaced by the delimiter character " " (space). Furthermore, the meaning of the delimiter character "," in the embodiment may be different from a meaning of the delimiter character "," in conventional RDF.

Furthermore, for example, in the area AR11 included in FIG. 1, the second triple information SID22 in which the subject is "<employee>", the predicate is "<worksAt>", and the object is "<organization>" is located in the lower level concept of the second triple information SID11. In this way, in the lower level concept of the second triple information SID11, the second triple information SID22 that has the predicate and the object, which are common to those of the second triple information SID11, and that has the subject of "<person>" that is the lower level class of "<employee>" is located. In this way, in the hierarchy diagram STH1-1, a concept is embodied (lower level conceptualization) every time an arrow line is traced in the direction of the root of the arrow (in the downward direction). In other words, the hierarchy diagram STH1-1 indicates that a concept is abstracted (higher level conceptualization) every time an arrow line is traced in the direction of the head of the arrow (in the upward direction).

Then, the information processing apparatus 100 searches for the second triple information (Step S13). The information processing apparatus 100 searches the hierarchy diagram STH1-1 illustrated in FIG. 1. For example, the information processing apparatus 100 searches the hierarchy diagram STH1-1 in order to select, from among the pieces of the second triple information, the second triple information (hereinafter, also referred to as "target triple information") that is used for a clustering process.

The information processing apparatus 100 selects the target triple information in the process performed at Step S13 (Step S14). The information processing apparatus 100 selects the target triple information based on the statistical information of the second triple information and based on a predetermined standard. In the example illustrated in FIG. 1, the information processing apparatus 100 selects the target triple information by using, as the predetermined standard, a threshold "1000" indicated by a threshold TINF. Furthermore, the threshold may also appropriately be set based on the number of pieces of the first triple information or the number of pieces of clustering; however, this point will be described in detail later.

For example, the information processing apparatus 100 compares a count value of the second triple information with the threshold TINF that is the threshold "1000" and then selects the target triple information based on the obtained comparison result. If the count value of one of the pieces of the second triple information is less than a predetermined threshold and the count value of one of the other pieces of the second triple information that is directly linked to the node of the one of the pieces of the second triple information is equal to or greater than the predetermined threshold, the information processing apparatus 100 selects the one of the pieces of the second triple information as the target triple information. If the count value of one of the pieces of the second triple information is less than the a predetermined threshold and the count value of the second triple information positioned at one hierarchy above the one of the pieces of the second triple information that is linked by the arrow line is equal to or greater than the predetermined threshold, the information processing apparatus 100 selects the one of the pieces of the second triple information as the target triple information.

For example, the information processing apparatus 100 sequentially searches the hierarchy diagram STH1-1 for the second triple information from the top level hierarchy and selects, as the target triple information, the second triple information located at the position in which the count value is below the threshold TINF first time. For example, the information processing apparatus 100 sequentially searches the hierarchy diagram STH1-1 from the top level hierarchy toward the direction of the lower level concept (in the downward direction) and selects, as the target triple information, the second triple information located at the position in which the count value is below the threshold TINF first time. For example, if the information processing apparatus 100 selects a certain piece of the second triple information as the target triple information, the information processing apparatus 100 ends the search toward the direction of the lower level concept that is linked to the selected second triple information by the arrow line.

Consequently, the information processing apparatus 100 selects, as illustrated in a hierarchy diagram STH1-2, the target triple information based on the statistical information of the second triple information and based on the threshold TINF. In the example illustrated in FIG. 1, the information processing apparatus 100 selects, as the target triple information, the pieces of the second triple information associated with the hatched "0" symbols illustrated in the hierarchy diagram STH1-2. Specifically, the information processing apparatus 100 selects, as the target triple information, as indicated by a target triple list SINF1, second triple information SID25, second triple information SID31, second triple information SID32, second triple information SID55, and the like. As indicated by the target triple list SINF1, the information processing apparatus 100 selects, as the target triple information, the second triple information in which the count value is less than the threshold "1000".

The process described above is an example and the information processing apparatus 100 may also select the target triple information by using any algorithm as long as the information processing apparatus 100 can select desired target triple information. Furthermore, the hierarchy diagram STH1-1 is used to visually indicate the relation between the pieces of the second triple information and thus the information processing apparatus 100 may also select the target triple information by searching for the information included in the second triple information storage unit 122 without generating the hierarchy diagram STH1-1. The information processing apparatus 100 may also select the target triple information by searching for the second triple information by using the hierarchy information stored in the second triple information storage unit 122.

As described above, based on the count value that is the statistical information of each of the pieces of the second triple information and based on the threshold that is the predetermined standard, the information processing apparatus 100 selects, from among the pieces of the second triple information, the target triple information that is used for the clustering process. Namely, based on the count value that indicates the number of pieces of the first triple information associated with the second triple information, the information processing apparatus 100 selects the target triple information that is used for the clustering process. For example, the information processing apparatus 100 performs a search starting from a higher level and then selects, as the target triple information, the second triple information located at the position in which the count value is below the threshold first time. Consequently, the information processing apparatus 100 selects, as the target triple information, the second triple information with the count value that is less than the threshold and is closer to the threshold. Thus, the information processing apparatus 100 can perform clustering by using, as the target, the pieces of the second triple information having count values that are similar with each other to some extent based on the predetermined standard (threshold). Accordingly, the information processing apparatus 100 can allow the triple information to be appropriately classified. In this way, the information processing apparatus 100 can appropriately classify and efficiently use the triple information.

1-2. Clustering

In the following, the information processing apparatus 100 performs a clustering process by using the selected target triple information. First, the information processing apparatus 100 acquires information (Step S21). The information processing apparatus 100 acquires the target triple information indicated by a target triple information storage unit 124 illustrated in FIG. 2. The information processing apparatus 100 may also acquire the target triple information from the storage unit 120 (see FIG. 4) or may also acquire the target triple information from the information providing device 50 (see FIG. 3).

The target triple information storage unit 124 illustrated in FIG. 2 includes items, such as "target triple ID (the second triple ID)", "Subject (node ID)", "Predicate (edge ID)", "Object (node ID)", "statistical information", and the like. For example, the target triple information storage unit 124 stores therein information that is used to indicate the target triple information as a graph.

The "target triple ID (the second triple ID)" indicates the identification information for identifying the triple information. Furthermore, the "Subject (node ID)" indicates the value and the node ID that are associated with the subject included in the triple information identified by the target triple ID. Furthermore, the "Predicate (edge ID)" indicates the value and the edge ID that are associated with the predicate included in the triple information identified by the second triple ID. Furthermore, the "Object (node ID)" indicates the value and the node ID that are associated with the object included in the triple information identified by the second triple ID. In the example illustrated in FIG. 2, from among the pieces of data associated with the "Subject (node ID)", the "Predicate (edge ID)", and the "Object (node ID)", the portion surrounded by "<" and ">" corresponds to each value and the portion surrounded by "(" and ")" corresponds to each ID.

Furthermore, in the "statistical information", the item, such as "count value", is included. In the "count value", the count value that is based on the number of pieces of the first triple information associated with the triple information identified by the second triple ID is stored.

In the example illustrated in FIG. 2, the target triple information storage unit 124 stores therein the triple information, such as the second triple information SID25 identified by the target triple ID "SID25", the second triple information SID31 identified by the target triple ID "SID31", and the like.

In the example illustrated in FIG. 2, the second triple information SID32 identified by the target triple ID "SID32" indicates that the subject is "<engineer>", i.e., an engineer. Furthermore, the second triple information SID32 indicates that the node ID of the subject "<engineer>" of the second triple information SID32 is "N16".

Furthermore, the second triple information SID32 indicates that the predicate is "<worksAt>", i.e., the predicate having the meaning of "works at". Furthermore, the second triple information SID32 indicates that the edge ID of the predicate "<worksAt>" of the second triple information SID32 is "p20".

Furthermore, the second triple information SID32 indicates that the object is "<organization>", i.e., an organization. Furthermore, the second triple information SID32 indicates that the node ID of the object "<organization>" of the second triple information SID32 is "N21". Furthermore, the second triple information SID32 indicates that the count value of the second triple information SID32 is "200".

In the example illustrated in FIG. 2, the second triple information SID55 identified by the target triple ID "SID55" indicates that the object is "<engineer>", i.e., an engineer. Furthermore, the second triple information SID55 indicates that the node ID of the object "<engineer>" is "N16". Namely, in a graph (hereinafter, also referred to as a "skeleton graph") illustrated in FIG. 2, it is indicated that the subject "<engineer>" of the second triple information SID32 and the object "<engineer>" of the second triple information SID55 are represented as the same node N16.

Then, the information processing apparatus 100 generates graph information by using the target triple information (Step S22). In the example illustrated in FIG. 1, the information processing apparatus 100 generates a skeleton graph GINF11 based on the target triple information storage unit 124. For example, the information processing apparatus 100 generates the skeleton graph GINF11 in which the subject and the object included in each of the pieces of the target triple information are used as nodes and the predicate is used as the edge.

Furthermore, in the skeleton graph GINF11 illustrated in FIG. 2, an illustration of "node N* (* is an arbitrary numerical value)" is appropriately omitted and is indicated by adding a value of "*" of a "node N*" inside the symbol "O" associated with each of the corresponding nodes. Namely, the portion "*" matched with the "node N*" is associated with the corresponding node. For example, the symbol "O" that is located at the upper left in the skeleton graph GINF11 and in which "1" is added is associated with the node (node N1) identified by the node ID "N1". Furthermore, the edge indicated by the arrow line is the edge associated with the sign added to the vicinity thereof. For example, the arrow line heading to the node N1 positioned at the upper left of the skeleton graph GINF11 is associated with the edge (edge p1) identified by the edge ID "p1".

In this way, in the skeleton graph GINF11, it is indicated that each of the pieces of the target triple information is represented by a set of two nodes and an edge. Namely, in the skeleton graph GINF11, it is indicated that a single piece of the target triple information is constituted by the subject indicated by the node that becomes the link source of the edge, the predicate indicated by the edge, and the object indicated by the node that becomes the link destination of the edge. Specifically, in the skeleton graph GINF11, it is indicated that the second triple information SID31 that is the target triple information is constituted by a node N8, an edge p10, and a node N13. The subject "<engineer>" of the second triple information SID31 is associated with the node N8, the predicate "<worksAt>" of the second triple information SID31 is associated with the edge p10, and the subject "<company>" of the second triple information SID31 is associated with the node N13. In this way, in the skeleton graph GINF11, each of the pieces of the target triple information is represented in a mode obtained by being broken down into two nodes and an edge; however, the information processing apparatus 100 performs clustering by using, instead of each of the nodes, a set of two nodes and an edge, i.e. the target triple information, as a target.

Here, the information processing apparatus 100 generates relationship information indicating the relationship between the pieces of the target triple information. In the example illustrated in FIG. 2, the information processing apparatus 100 calculates the distance between the pieces of the target triple information as the relationship information. For example, the information processing apparatus 100 calculates the distance based on the information (path information) related to the path (route) between the pieces of the target triple information. For example, based on the path information between two pieces of the target triple information, the information processing apparatus 100 calculates the distance between the subject two pieces of the target triple information. For example, based on the number of edges on the route between the two pieces of the target triple information corresponding to the calculation target, the information processing apparatus 100 calculates the distance between the subject two pieces of the target triple information. For example, based on the count value of the target triple information on the route between the two pieces of the target triple information corresponding to the calculation target, the information processing apparatus 100 calculates the distance between the subject two pieces of the target triple information.

For example, based on a calculation formula in which the number of edges on the route between the two pieces of the target triple information corresponding to the calculation target is used as the denominator, the information processing apparatus 100 calculates the distance between these two pieces of the target triple information. Furthermore, in the edge on the route between the two pieces of the target triple information, the edge of these two pieces of the target triple information may also be included. For example, in a case of the second triple information constituted by the node N8, the edge p9, and a node N15 and the second triple information SID31, the information processing apparatus 100 calculates the distance by using the number of edges on the route as "2".

For example, based on a calculation formula in which the sum total of the count values of the pieces of the target triple information on the route between the two pieces of the target triple information corresponding to the calculation target is used as the numerator, the information processing apparatus 100 calculates the distance between these two pieces of the target triple information. Furthermore, in the target triple information on the route between the two pieces of the target triple information, the subject two pieces of the target triple information themselves may be included. For example, in a case of the second triple information (referred to as the "second triple information SIDX") constituted by the node N8, the edge p9, and the node N15 and the second triple information SID31, the information processing apparatus 100 calculates the distance by using the total value of the count values of the second triple information SIDX and the count value of the second triple information SID31.

For example, in a case of the second triple information SID31 and the second triple information SID32, the information processing apparatus 100 calculates the distance by using the number of edges on the route as "4". For example, the information processing apparatus 100 calculates the distance by using the number of edges on the route as "4", i.e., the edges p10, p9, p15, and p20. For example, in a case of the second triple information SID31 and the second triple information SID32, the information processing apparatus 100 calculates the distance by using the total value of the count value of the second triple information SID31; the count value of the second triple information constituted by the node N8, the edge p9, and a node N15; the count value of the second triple information constituted by the node N15, an edge p15, and a node N16; and the count value of the second triple information SID32.

For example, the information processing apparatus 100 may also calculate the distance by using a formula of "distance=−(total value of count value/number of edges)" or the like. For example, the information processing apparatus 100 may also calculate the distance by multiplying negative one by a value obtained by dividing the total values of the count value by the number of edges. In this case, the information processing apparatus 100 performs a subsequent clustering process assuming that the distance is small (close) as the negative value is increased. Furthermore, for example, if there is no route between two pieces of the target triple information, the information processing apparatus 100 may also calculate the distance between the two pieces of the target triple information as a predetermined maximum value. For example, if there is no route between two pieces of the target triple information, the information processing apparatus 100 may also calculate the distance between the subject two pieces of the target triple information as "0". In other words, if two pieces of target triple information are not linked, the information processing apparatus 100 may also calculate the distance between the two pieces of the target triple information as "0".

Furthermore, if normalization of the distance is needed, the information processing apparatus 100 may also normalize the distance and then perform the clustering process based on the normalized distance. For example, the information processing apparatus 100 may also perform normalization such that the distance takes a value equal to or greater than zero. For example, the information processing apparatus 100 may also perform normalization such that the distance is in the range of 0 to 1.

Furthermore, the above description is an example and the information processing apparatus 100 may also calculate the distance by appropriately using various kinds of information. For example, the information processing apparatus 100 calculates a distance such that the distance is decreased as the total value of the count values is increased. Furthermore, the information processing apparatus 100 calculates a distance such that the distance of a smaller number of edges is decreased. Furthermore, the information processing apparatus 100 may also calculate the distance by adding the information that indicates the conceptual relationship between the individual nodes to the skeleton graph GINF11, which will be described in detail later.

Then, the information processing apparatus 100 performs clustering (Step S23). The information processing apparatus 100 generates the cluster information by performing clustering on the selected target triple information. The information processing apparatus 100 generates the cluster information CLINF11 obtained by performing clustering on the target triple information. The information processing apparatus 100 performs clustering on the target triple information included in the skeleton graph GINF11. In the example illustrated in FIG. 2, the information processing apparatus 100 performs, by using a predetermined clustering method, clustering a plurality of pieces of target triple information. For example, the information processing apparatus 100 may also perform clustering on a plurality of pieces of target triple information by appropriately using various conventional technologies. The information processing apparatus 100 may also use various clustering methods, such as logistic regression using k-means or a Dirichlet process.

For example, the information processing apparatus 100 may also perform clustering on a plurality of pieces of target triple information by using a predetermined clustering method such that the pieces of the target triple information whose distance is within a predetermined are classified into the same cluster. For example, the information processing apparatus 100 may also perform clustering on a plurality of pieces of target triple information by using a predetermined clustering method such that a difference between the sum total of the count values of the pieces of the target triple information is uniform. For example, the information processing apparatus 100 may also perform clustering on a plurality of pieces of target triple information by using a predetermined clustering method such that a difference between the sum total of the count values of the pieces of the target triple information is within a predetermined value.

In the example illustrated in FIG. 2, the information processing apparatus 100 performs clustering such that each of the pieces of the target triple information is classified into clusters CL1 to CL3 or the like. For example, the information processing apparatus 100 performs clustering on the second triple information SID31 so as to be in the cluster CL2. For example, the information processing apparatus 100 performs clustering on the second triple information SID32 so as to be in the cluster CL3.

As described above, the information processing apparatus 100 performs the clustering process on the selected target triple information used as the target. In this way, the information processing apparatus 100 performs clustering on, as the target triple information, the pieces of the second triple information in which a count value is less than the threshold and is close to the threshold. Thus, the information processing apparatus 100 can perform clustering on the pieces of the second triple information, as the target, each having a count value that is similar to some extent based on the predetermined standard (threshold). Consequently, the information processing apparatus 100 can appropriately classify and efficiently use the triple information. For example, the cluster information generated by the information processing apparatus 100 can be used in a case where the first triple information is stored in a distributed manner. For example, the information processing apparatus 100 may also store, based on the generated cluster information, the pieces of the first triple information in a plurality of storage devices for each of the pieces of the first triple information associated with the pieces of the target triple information belonging to the individual clusters. Consequently, the information processing apparatus 100 can store, in the same storage device, the pieces of the first triple information associated with a similar concept. Furthermore, in order to efficiently use the triple information described above, division management is needed; however, with an existing clustering method, calculating a machine cost (processing cost) of computers needed for division becomes huge. In contrast, the information processing apparatus 100 can suppress an increase in calculation of a machine cost by performing the clustering process on the selected target triple information as the target. Namely, the information processing apparatus 100 is more effective in considerably reducing in calculation of a machine cost than ever before. Furthermore, when the triple information described above is divided, use efficiency is more increased in a case in which triples having high relationship are collected as a single division unit (cluster). Thus, the information processing apparatus 100 can enhance the use efficiency of the triple information by performing clustering such that the pieces of the triple information having high relationship are classified into the same cluster. Namely, the information processing apparatus 100 is effective in dividing the triple information such that the use efficiency is enhanced as much as possible at a lower calculating machine cost than ever before.

1-3. Selection of Target Triple Information

Figure 11:
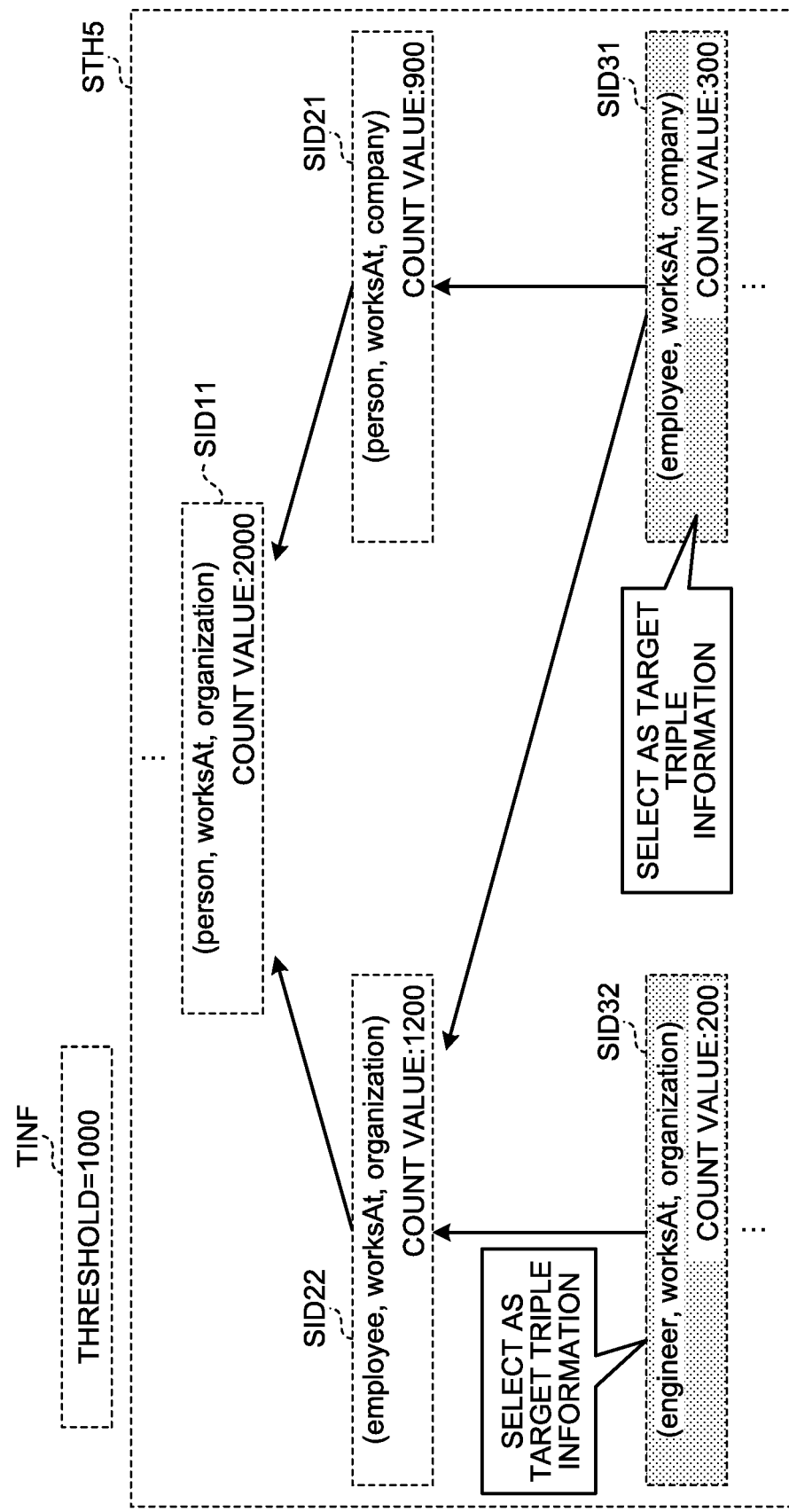
FIG. 11 is a diagram illustrating an example of selecting target triple information according to the embodiment.

Furthermore, in the example described above, a description has been given of a case in which, if a count value of one of the pieces of the second triple information is the predetermined threshold and a count value of the second triple information positioned at one hierarchy above the one of the pieces of the second triple information that is linked by the arrow line is equal to or greater than the predetermined threshold, the information processing apparatus 100 selects the one of the pieces of the second triple information as the target triple information; however, the information processing apparatus 100 may also select the target triple information by using various conditions. This point will be described by using FIG. 11. FIG. 11 is a diagram illustrating an example of selecting target triple information according to the embodiment. Furthermore, descriptions of the same points as those described in FIG. 1 or FIG. 2 will appropriately be omitted.

For example, as illustrated in FIG. 11, the information processing apparatus 100 may also select the target triple information by appropriately use various conditions. The example illustrated in FIG. 11 also indicates a case in which the information processing apparatus 100 selects the target triple information by using, as the predetermined standard, the threshold "1000" indicated by the threshold TINF. In the example illustrated in FIG. 11, a simple specific example will be described by using, as an example, a hierarchy diagram STH5 that is a portion associated with the area AR11 in the hierarchy diagram STH1-1 illustrated in FIG. 1. In the hierarchy diagram STH5 illustrated in FIG. 11, it is assumed that the count value of the second triple information SID11 is "2000", the count value of the second triple information SID21 is "900", and the count value of the second triple information SID22 is "1200". Furthermore, in the hierarchy diagram STH5 illustrated in FIG. 11, it is assumed that the count value of the second triple information SID31 is "300" and the count value of the second triple information SID32 is "200".

In the example illustrated in FIG. 11, the information processing apparatus 100 selects, as the target triple information, the second triple information SID31 and the second triple information SID32 in each of which is linked to the second triple information SID22 that is located one hierarchy above and that has a count value equal to or greater than the threshold "1000" and in each of which has the count value that is less than the threshold "1000". In contrast, the information processing apparatus 100 does not select, as the target triple information, the second triple information SID21 that is located one hierarchy above the second triple information SID11 whose count value is equal to or greater than the threshold "1000" and that has the count value that is less than the threshold "1000". Specifically, the information processing apparatus 100 does not select the second triple information SID21 as the target triple information because the second triple information SID21 satisfies the threshold condition but the second triple information positioned at the lower level than the second triple information SID21 has been selected as the target triple information. Furthermore, the above description is an example and the information processing apparatus 100 may also select the target triple information by appropriately use various conditions.

For example, the information processing apparatus 100 may also decide the second triple information as the target triple information by performing the following process. For example, after having selected the target triple information at Step S14 illustrated in FIG. 1, by performing a close examination process on the selected target triple information (hereinafter, referred to as a "target triple candidate group"), the information processing apparatus 100 may also decide the second triple information that is finally selected as the target triple information. For example, the information processing apparatus 100 performs the following close examination process.

First, the information processing apparatus 100 extracts, one by one, elements (hereinafter, referred to as "close examination target triple") from the target triple candidate group. The information processing apparatus 100 collects, as a set ST2 the second triple information (schema triple) that is more concrete than the extracted close examination target triple (target triple information). Then, the information processing apparatus 100 determines whether each of the elements (the second triple information) included in the set ST2 is included in the target triple candidate group. If one of the elements included in the set ST2 is included in the target triple candidate group, the information processing apparatus 100 excludes the close examination target triple from the target triple candidate group (skeleton graph). The information processing apparatus 100 performs this process on all of the pieces of the target triple information included in the target triple candidate group.

For example, even if the second triple information SID21 has been selected as the target triple information at Step S14 illustrated in FIG. 1, the information processing apparatus 100 can exclude, by performing the close examination process described above, the second triple information SID21 from the target triple candidate group (skeleton graph). Furthermore, the above description is an example and the information processing apparatus 100 may also perform the close examination process by appropriately using various algorithms.

1-4. Threshold

Furthermore, the information processing apparatus 100 may also decide the threshold by appropriately using various kinds of information. The information processing apparatus 100 may also set a predetermined initial value, update the threshold in accordance with the selection result of the target triple information, and repeatedly perform the selecting process until desired target triple information is selected. For example, the information processing apparatus 100 may also set a predetermined initial value, increase the threshold by an amount corresponding to a predetermined increase value every time the selecting process is repeated, and repeatedly perform the selecting process until the desired target triple information has been selected.

For example, the information processing apparatus 100 may also use N/P as the initial value, where the total number of triple is N (arbitrary number) and the number of divisions is P (arbitrary number). For example, the information processing apparatus 100 may also use "1 million (100 million/100)" as the initial value of the threshold, where the total number of pieces of the first triple information denoted by N is 100 million and the number of divisions denoted by P is 100. Furthermore, for example, in a case where the average value of the count values (statistical value) of the pieces of the second triple information (schema triple) is denoted by A, the information processing apparatus 100 may also use 10*A as an increase value. For example, if the average value of the count values (statistical value) of the pieces of the second triple information (schema triple) is "500", the information processing apparatus 100 may also use "5000 (10*500)" as an increase value. Furthermore, the above description is an example and the information processing apparatus 100 may also set the threshold by appropriately using various kinds of information.

1-5. Addition of Conceptual Relationship Information

The information processing apparatus 100 may also generate the relationship information by adding various kinds of information to the skeleton graph. The information processing apparatus 100 may also calculate the distance between each of the pieces of the target triple information by adding various kinds of information to the skeleton graph. This point will be described by using FIG. 14. FIG. 14 is a diagram illustrating clustering according to the embodiment. Furthermore, descriptions of the same points as those described in FIG. 1 or FIG. 2 will appropriately be omitted.

For example, the information processing apparatus 100 may also calculate the distance between the pieces of the target triple information by taking into account the conceptual relationship between the target triple information. The information processing apparatus 100 may also calculate the distance between the pieces of the target triple information by adding the edge (hereinafter, referred to as a "conceptual relationship edge") indicating a higher/lower level conceptual relationship between the pieces of the target triple information to the skeleton graph.

First, the information processing apparatus 100 adds the conceptual relationship edge to the skeleton graph (Step S51). For example, the information processing apparatus 100 may also add, by using the information indicated by the ontology information storage unit 123 (see FIG. 7), the concept edge that indicates the higher/lower level conceptual relationship between the pieces of the target triple information to the skeleton graph.

For example, the information processing apparatus 100 searches the ontology information storage unit 123 for ontology information that includes the subject or the object associated with the subject or the object of the target triple information and that indicates the higher level/lower level relationship of the concept. For example, the information processing apparatus 100 searches the ontology information storage unit 123 for ontology information that includes the subject or the object associated with the subject or the object included in the target triple information and that includes the predicate of "rdfs:subClassOf". For example, the information processing apparatus 100 performs a search on all identifiers associated with the subject or the object included in the target triple information as the target. From among all of the identifiers associated with the subject or the object included in the target triple information, the information processing apparatus 100 searches for the ontology information in which a certain identifier is the subject, another identifier is the object, and the predicate is "rdfs:subClassOf".

For example, in the ontology information storage unit 123, the ontology information TID222 in which "<engineer>" associated with the node N16 included in the skeleton graph is the subject, "<employee>" associated with the node N8 is the object, and "rdfs:subClassOf" is the predicate is included. Namely, it is indicated that "<engineer>" associated with the node N16 included in the skeleton graph is a lower level concept of "<employee>" associated with the node N8. In the example illustrated in FIG. 14, the information processing apparatus 100 adds an conceptual relationship edge CE2 or the like that indicates that conceptual vertical relationship is present between the node N16 that is associated with "<engineer>" and the node N8 that is associated with "<employee>".

In this way, the information processing apparatus 100 generates the skeleton graph GINF21 in which the conceptual relationship edge indicating the conceptual relationship between the subjects or the objects associated with the nodes included in the skeleton graph has been added. In the example illustrated in FIG. 14, the information processing apparatus 100 adds the conceptual relationship edge CE1 that indicates the conceptual relationship between a node N17 and the node N5, the conceptual relationship edge CE2 that indicates the conceptual relationship between the node N16 and the node N8, and the like.

Then, the information processing apparatus 100 generates the relationship information, by using the skeleton graph GINF21 in which the conceptual relationship edge has been added, that indicates the relationship between the pieces of the target triple information. In the example illustrated in FIG. 14, the information processing apparatus 100 calculates, as the relationship information, the distance between the target triple information. For example, the information processing apparatus 100 calculates, similarly to FIG. 2, the distance based on the path information related to the path (route) between the target triple information.

For example, the information processing apparatus 100 may also calculate the distance by using, similarly to FIG. 2, the formula of "distance=–(total value of count value/number of edges)" or the like. Furthermore, the information processing apparatus 100 calculates the number of edges by using the conceptual relationship edges as the target for calculating the number of edges. In contrast, the information processing apparatus 100 does not use the conceptual relationship edges as the target for calculating the sum total of the count values. In other words, the information processing apparatus 100 does not use, as the target for calculating the sum total of the count values, the triple information that is linked by the conceptual relationship edges. Namely, the information processing apparatus 100 calculates the sum total of count values by excluding the conceptual relationship edges when calculating the sum total of the count values.

Then, the information processing apparatus 100 performs clustering (Step S52). The information processing apparatus 100 generates cluster information by performing clustering on the selected target triple information. The information processing apparatus 100 generates cluster information CLINF11 by performing clustering on the target triple information. The information processing apparatus 100 performs clustering on the target triple information included in the skeleton graph GINF11. In the example illustrated in FIG. 14, the information processing apparatus 100 performs clustering a plurality of pieces of target triple information by using the predetermined clustering method. For example, the information processing apparatus 100 may also perform clustering on a plurality of pieces of target triple information by appropriately using various conventional technologies. The information processing apparatus 100 may also use various clustering methods, such as logistic regression using k-means or a Dirichlet process.

In the example illustrated in FIG. 14, the information processing apparatus 100 performs clustering such that each of the pieces of the target triple information are classified into the clusters CL51 to CL53 or the like. For example, the result of clustering is different from that illustrated in FIG. 2 in that the information processing apparatus 100 performs clustering such that the second triple information constituted by a node N5, the edge p3, and a node N2 is classified into the cluster CL53. For example, due to the addition of the conceptual relationship edge CE1, the information processing apparatus 100 performs clustering such that the second triple information constituted by the node N5, the edge p3, and the node N2 is classified into the cluster CL53.

In this way, the information processing apparatus 100 can more appropriately perform clustering by adding the conceptual relationship edge that indicates the conceptual relationship between the nodes to the skeleton graph.

1-6. Skeleton Graph

In the example illustrated in FIG. 2, a case in which the subject and the object in the target triple information are used as a node and the predicate is used as an edge has been described; however, the information processing apparatus 100 may also generate skeleton graphs in various modes. For example, the information processing apparatus 100 may also generate a skeleton graph in which all of the elements included in the target triple information are used as nodes. Namely, the information processing apparatus 100 may also generate a skeleton graph in which the subject, the predicate, and the object included in each of the pieces of the target triple information are used as nodes.

In this case, the information processing apparatus 100 may also generate a skeleton graph in which the subjects, the predicates, and the objects included in the target triple information are used as nodes and the elements included in the same target triple information are linked by edges. For example, the information processing apparatus 100 may also link a single piece of target triple information by a first edge, in which the subject is as the link source and the predicate is used as the link destination, and by the second edge, in which the predicate is used as the link source and the object is used as the link destination. Consequently, the information processing apparatus 100 may also generate the skeleton graph in which nodes are linked in the order of "subject→predicate→object". In this case, the information processing apparatus 100 stores therein information that indicates the association relationship between the first edge and the second edge.

1-6-1. Addition of Conceptual Relationship Information between Predicates

Furthermore, for example, the information processing apparatus 100 may also calculate the distance between the pieces of target triple information by taking in account of the conceptual relationship between the predicates. The information processing apparatus 100 may also calculate the distance between the pieces of target triple information by adding, to the skeleton graph, the conceptual relationship edge that indicates the higher/lower level conceptual relationship between the predicates.

For example, the information processing apparatus 100 searches the ontology information storage unit 123 for the ontology information that includes the predicate associated with the predicate included in the target triple information and that indicates the higher level/lower level conceptual relationship. For example, the information processing apparatus 100 searches the ontology information storage unit 123 for the ontology information that includes the subject or the object associated with the predicate included in the target triple information and that has the predicate of "rdfs:SubPropertyOf". If the ontology information that includes the subject or the object associated with the predicate included in the target triple information and that has the predicate of "rdfs:SubPropertyOf" is present in the ontology information storage unit 123, the information processing apparatus 100 may also link the nodes associated with the predicate included in the subject target triple information by the conceptual relationship edge.

2. Configuration of the Information Processing System

Figure 3:
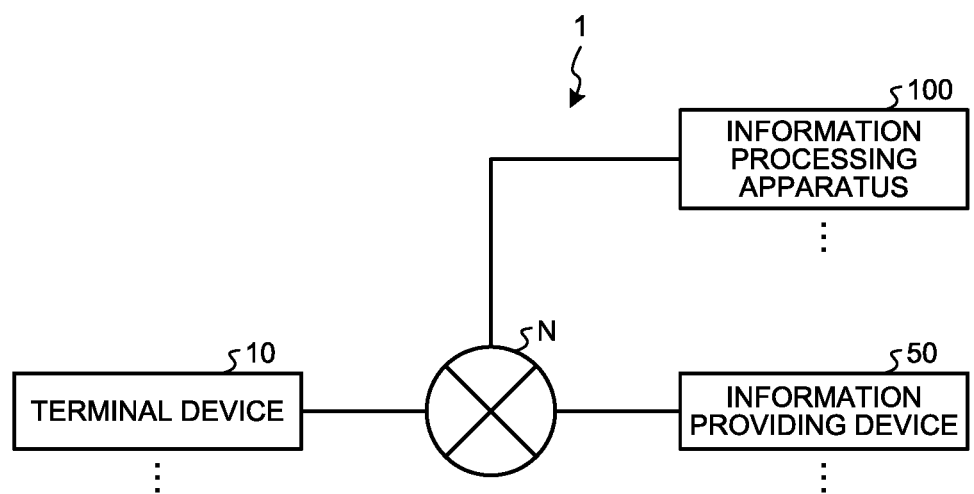
FIG. 3 is a diagram illustrating a configuration example of an information processing system according to the embodiment.

As illustrated in FIG. 3, an information processing system 1 includes a terminal device 10, the information providing device 50, and the information processing apparatus 100. The terminal device 10, the information providing device 50, and the information processing apparatus 100 are connected via a predetermined network N so as to be communicated with each other in a wired or wireless manner. FIG. 3 is a diagram illustrating a configuration example of the information processing system according to the embodiment. Furthermore, in the information processing system 1 illustrated in FIG. 3, a plurality of the terminal devices 10, a plurality of the information providing devices 50, and a plurality of the information processing apparatus 100 may also be included.

The terminal device 10 is an information processing apparatus used by a user. The terminal device 10 receives various kinds of operations performed by the user. In a description below, the terminal device 10 is sometimes referred to as a user. Namely, in a description below, a user can also be read as the terminal device 10. Furthermore, the terminal device 10 described above can be implemented by, for example, a smartphone, a tablet terminal, a notebook personal computer (PC), a desktop PC, a mobile phone, a personal digital assistance (PDA), or the like.

The information providing device 50 is an information processing apparatus that stores therein the triple information based on the character information or the like collected from various kinds of external devices, such as web servers, or the like. For example, the information providing device 50 creates the triple information based on the information related to the resources collected from various kinds of external devices, such as web servers, or the like. Furthermore, for example, the information providing device 50 provides the first triple information, the second triple information, and the ontology information to the information processing apparatus 100.

The information processing apparatus 100 is an information processing apparatus that selects, based on the statistical information and based on the predetermined standard related to the statistical information, from among a plurality of pieces of the second triple information, a plurality of pieces of the target triple information that are used for the clustering process. The information processing apparatus 100 generates, based on the elements included in each of the pieces of the selected target triple information, the relationship information that indicates the relationship between the plurality of pieces of the target triple information. The information processing apparatus 100 generates, based on the relationship information, the cluster information obtained by performing clustering on the plurality of the pieces of the target triple information. Furthermore, the information processing apparatus 100 provides the terminal device 10 to the statistical information related to the first triple information. Furthermore, the information processing apparatus 100 may also generate, regarding each of the pieces of the second triple information, the statistical information related to the first triple information. The information processing apparatus 100 may also calculate, based on the number of pieces of the first triple information associated with the corresponding pieces of the second triple information, the statistical information related to the plurality of pieces of the first triple information. Furthermore, the information processing apparatus 100 may also generate the triple information based on the information related to the resource collected from various kinds of external devices, such as web servers, or the like. For example, the information processing apparatus 100 may also create the first triple information, the second triple information, and the ontology information based on the information related to the resources collected from various kinds of external devices, such as web servers, or the like.

3. Configuration of the Information Processing Apparatus

Figure 4:
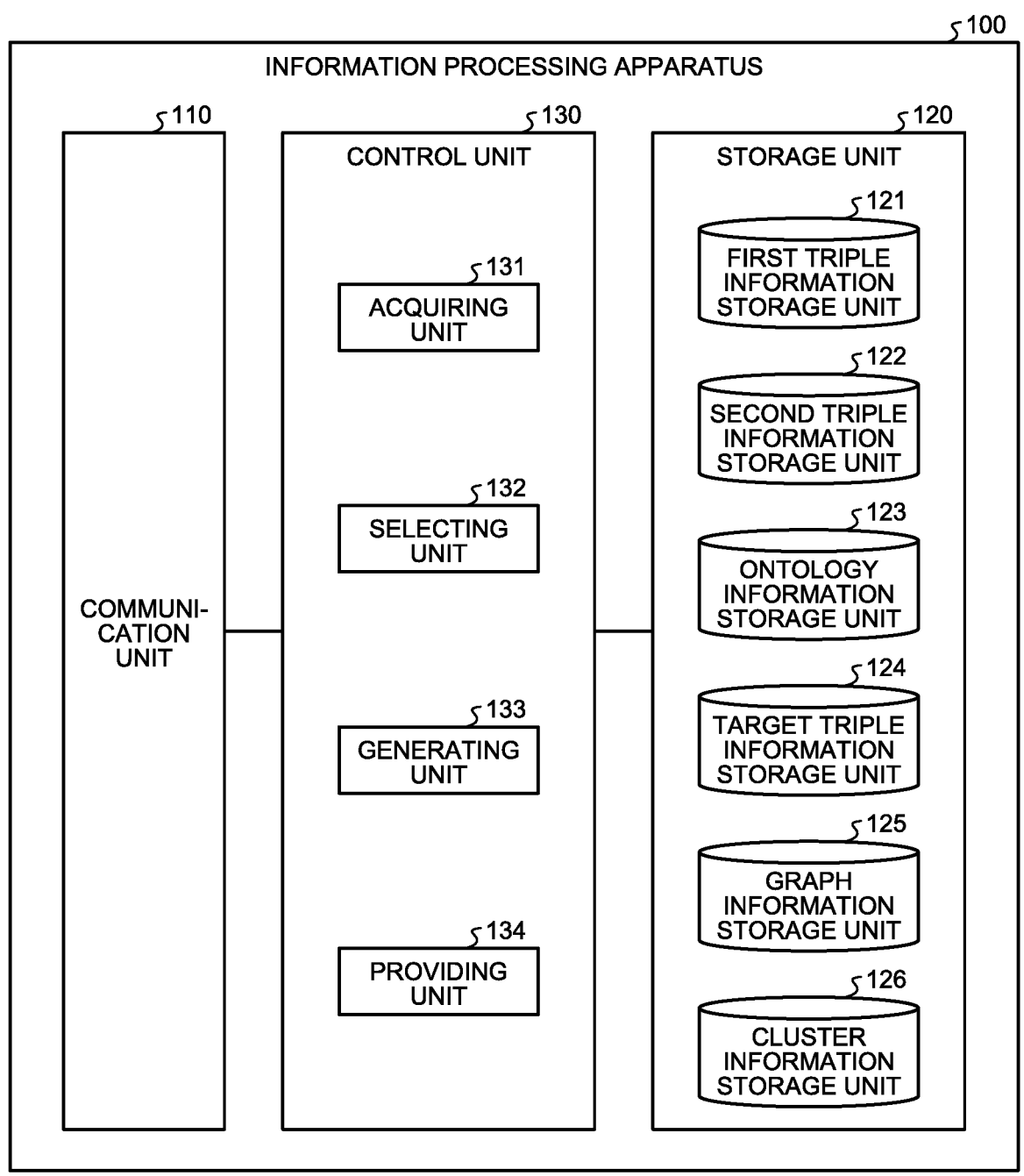
FIG. 4 is a diagram illustrating a configuration example of an information processing apparatus according to the embodiment.

In the following, the configuration of the information processing apparatus 100 according to the embodiment will be described with reference to FIG. 4. FIG. 4 is a diagram illustrating a configuration example of the information processing apparatus 100 according to the embodiment. As illustrated in FIG. 4, the information processing apparatus 100 includes a communication unit 110, the storage unit 120, and a control unit 130. Furthermore, the information processing apparatus 100 may also include an input unit (for example, a keyboard, a mouse, or the like) that receives various kinds of operations from an administrator of the information processing apparatus 100 or a displaying unit (for example, a liquid crystal display, or the like) that displays various kinds of information.

Communication Unit 110

The communication unit 110 is implemented by, for example, a network interface card (NIC), or the like. Furthermore, the communication unit 110 is connected to a network (for example, the network N illustrated in FIG. 3) in a wired or wireless manner and sends and receives information to and from the terminal device 10.

Storage Unit 120

The storage unit 120 is implemented by, for example, a semiconductor memory device, such as a random access memory (RAM), a flash memory, or the like, or a storage device, such as a hard disk, an optical disk, or the like. The storage unit 120 according to the embodiment includes, as illustrated in FIG. 4, the first triple information storage unit 121, the second triple information storage unit 122, the ontology information storage unit 123, the target triple information storage unit 124, a graph information storage unit 125, and a cluster information storage unit 126.

First Triple Information Storage Unit 121

The first triple information storage unit 121 according to the embodiment stores therein various kinds of information related to the triple. For example, the first triple information storage unit 121 stores therein triple information or association information. FIG. 5 is a diagram illustrating an example of the first triple information storage unit according to the embodiment. The first triple information storage unit 121 illustrated in FIG. 5 has the items, such as "first triple ID", "Subject", "Predicate", "Object", and the like.

The "first triple ID" indicates the identification information for identifying the triple information. The "Subject" indicates the value associated with the subject in the triple information identified by the first triple ID. The "Predicate"

indicates the value associated with the predicate in the triple information identified by the first triple ID. The "Object" indicates the value associated with the object in the triple information identified by the first triple ID.

In the example illustrated in FIG. 5, the first triple information storage unit 121 stores therein a large number of pieces of (for example, billions, tens of billions, etc.) triple information, such as the first triple information FID11 identified by the first triple ID "FID11", the first triple information FID1105 identified by the first triple ID "FID1105", and the like.

In the example illustrated in FIG. 5, the first triple information FID11 identified by the first triple ID "FID11" indicates that the subject is "<Jim>", i.e., a predetermined person "Jim". Furthermore, in the example illustrated in FIG. 5, the first triple information FID11 indicates that the predicate is "<worksAt>", i.e., the predicate having the meaning of "works at". Furthermore, in the example illustrated in FIG. 5, the first triple information FID11 indicates that the object is "<HOGE.inc>", i.e., a predetermined company "HOGE, Inc.". In this way, in the example illustrated in FIG. 5, the first triple information FID11 is the triple information associated with the specific meaning indicating that "Jim works at HOGE, Inc.".

Furthermore, in the example illustrated in FIG. 5, the first triple information FID21 identified by the first triple ID "FID21" indicates that the subject is "<Jim>". Furthermore, in the example illustrated in FIG. 5, the first triple information FID21 indicates that the predicate is "<hasAge>", i.e., the predicate having the meaning of "years old". Furthermore, in the example illustrated in FIG. 5, the first triple information FID11 indicates that the object is "32", i.e., the numerical value "32". In this way, in the example illustrated in FIG. 5, the first triple information FID21 is the triple information associated with the specific meaning indicating that "Jim is 32 years old".

Furthermore, in addition to the information described above, the first triple information storage unit 121 may also store therein various kinds of information in accordance with purposes. For example, the first triple information storage unit 121 may also store therein triple information associated with abstract meaning. For example, the first triple information storage unit 121 may also store therein a predetermined property in each of the "Subject", the "Predicate", and the "Object".

Second Triple Information Storage Unit 122

The second triple information storage unit 122 according to the embodiment stores therein various kinds of information that are used to refer to the triple information stored in the first triple information storage unit 121. FIG. 6 is a diagram illustrating an example of the second triple information storage unit according to the embodiment. The second triple information storage unit 122 illustrated in FIG. 6 has items, such as "second triple ID", "Subject", "Predicate", "Object", "hierarchy information", "statistical information", and the like. Furthermore, although not illustrated, the second triple information storage unit 122 stores therein information indicating the first triple information associated with each of the pieces of the second triple information. For example, the second triple information storage unit 122 stores therein the information indicating the first triple information that has been counts as each of the pieces of the second triple information by associating the information with the second triple information.

The "second triple ID" indicates the identification information for identifying the triple information. Furthermore, the "Subject" indicates the value associated with the subject in the triple information identified by the second triple ID. Furthermore, the "Predicate" indicates the value associated with the predicate in the triple information identified by the second triple ID. Furthermore, the "Object" indicates the value associated with the object in the triple information identified by the second triple ID.

Furthermore, the "hierarchy information" has items, such as "higher level 1", "higher level 2", and the like. For example, the "higher level 1" or the "higher level 2" stores therein the information that identifies the triple information associated with the higher level concept (higher level class) of the triple information identified by the second triple ID. Furthermore, in FIG. 6, only the "higher level 1" and the "higher level 2" are illustrated; however, a "higher level 3", a "higher level 4", or the like may also be included so as to store all of the pieces of the triple information associated with the higher level class of the triple information.

Furthermore, the "statistical information" has items, such as "hierarchy", "count value", and the like. For example, in the "hierarchy", the hierarchy in the second triple information of the triple information identified by the second triple ID is stored. For example, the "count value" stores therein the count value of the triple information identified by the second triple ID. For example, the "count value" stores therein the count value that is based on the number of pieces of the first triple information associated with the triple information identified by the second triple ID.

In the example illustrated in FIG. 6, the second triple information storage unit 122 stores therein triple information, such as the second triple information SID21 identified by the second triple ID "SID21", the second triple information SID41 identified by the second triple ID "SID41", and the like.

In the example illustrated in FIG. 6, the second triple information SID1 identified by the second triple ID "SID1" indicates that the subject is "<owl:Thing>" and is the class that is associated with a predetermined class, for example, a set of all individuals. Furthermore, in the example illustrated in FIG. 6, the second triple information SID1 indicates that the predicate is "<rdf:Property>" and is the class representing a predetermined class, for example, a property. Furthermore, in the example illustrated in FIG. 6, the second triple information SID1 indicates that the object is "<owl:Thing>" and is a class that is associated with a predetermined class, for example, a set of all individuals. In this way, in the example illustrated in FIG. 6, the second triple information SID1 is the triple information associated with the abstract meaning indicating that, for example, "something has a relationship with something". For example, the second triple information SID1 is the triple information associated with the abstract meaning at the top level indicating that only the two things have a relationship.

Furthermore, the second triple information SID1 indicates that the second triple information in the higher level hierarchy is not present. Furthermore, the second triple information SID indicates that the hierarchy is a "0" hierarchy and the number of counts is "100000". For example, the second triple information SID1 is the top level hierarchy and is the second triple information that does not have further abstract second triple information.

In the example illustrated in FIG. 6, the second triple information SID11 identified by the second triple ID "SID11" indicates that the subject is "<person>", i.e., a person. Furthermore, in the example illustrated in FIG. 6, the second triple information SID11 indicates that the predicate is "<worksAt>", i.e., the predicate having the meaning of "works at". Furthermore, in the example illustrated in FIG.

6, the second triple information SID11 indicates that the object is "<organization>", i.e., an organization. In this way, in the example illustrated in FIG. 6, the second triple information SID11 is the triple information associated with the abstract meaning indicating that "a person works at an organization".

Furthermore, the second triple information SID11 indicates that the second triple information in the higher level hierarchy is the second triple information SID1. Furthermore, the second triple information SID11 indicates that the hierarchy is an "X (X is an arbitrary number)" hierarchy and the number of counts is "10000". For example, the second triple information SID11 is the second triple information in a hierarchy "1" immediately below the second triple information SID1 that is present in the top level hierarchy "0".

In the example illustrated in FIG. 6, the second triple information SID41 identified by the second triple ID "SID41" indicates that the subject is "<engineer>", i.e., an engineer. Furthermore, in the example illustrated in FIG. 6, the second triple information SID41 indicates that the predicate is "<worksAt>", i.e., the predicate having the meaning of "works at". Furthermore, in the example illustrated in FIG. 6, the second triple information SID41 indicates that the object is "<company>", i.e., a company. In this way, in the example illustrated in FIG. 6, the second triple information SID41 may also be the triple information associated with abstract meaning indicating that "an engineer works at a company".

Furthermore, the second triple information SID41 indicates that the second triple information in the higher level hierarchy is the second triple information SID31 or the second triple information SID32. Furthermore, the second triple information SID41 indicates that the hierarchy is the "X+3 (X is an arbitrary number)" hierarchy and the number of counts is "80". For example, the second triple information SID41 may also be the second triple information SID31 in a hierarchy "3" or may also be the second triple information in a hierarchy "4" immediately below the second triple information SID32.

Furthermore, in addition to the information described above, the second triple information storage unit 122 may also store therein various kinds of information in accordance with purposes. For example, the second triple information storage unit 122 may also store therein triple information associated with specific meaning. For example, the second triple information storage unit 122 may also store a predetermined property in each of the "Subject", the "Predicate", and the "Object". Furthermore, for example, the second triple information storage unit 122 may also include the item, in the "hierarchy information", indicating a lower level concept (lower level class), such as "lower level 1" or "lower level 2", that is associated with the associated triple information.

Ontology Information Storage Unit 123

The ontology information storage unit 123 according to the embodiment stores therein various kinds of information related to a predetermined conceptual system (ontology). For example, the ontology information storage unit 123 stores therein the information related to the definition of each of the entity (substance). FIG. 7 is a diagram illustrating an example of the ontology information storage unit according to the embodiment. The ontology information storage unit 123 illustrated in FIG. 7 includes items, such as "ontology ID", "Subject", "Predicate", "Object", and the like.

The "ontology ID" indicates the identification information for identifying the triple information. Furthermore, the "Subject" indicates the value associated with the subject in the triple information identified by the ontology ID. The "Predicate" indicates the value associated with the predicate in the triple information identified by the ontology ID. The "Object" indicates the value associated with the object in the triple information identified by the ontology ID.

In the example illustrated in FIG. 7, the ontology information TID101 identified by the ontology ID "TID101" indicates that the subject is "<worksAt>". Furthermore, in the example illustrated in FIG. 7, the ontology information TID101 indicates that the predicate is "rdfs:domain", i.e., a predetermined property indicating a domain. In this case, the predicate "rdfs:domain" indicates the class that can be the subject of "<worksAt>". Furthermore, in the example illustrated in FIG. 7, the ontology information TID101 indicates that the object is "<person>", i.e., a person. In this way, in the example illustrated in FIG. 7, the ontology information TID101 defines that the classes that are lower than the class "<person>" can be used for the subject of "<worksAt>".

In the example illustrated in FIG. 7, the ontology information TID102 identified by the ontology ID "TID102" indicates that the subject is "<worksAt>". Furthermore, in the example illustrated in FIG. 7, the ontology information TID102 indicates that the predicate is "rdfs:range", i.e., a predetermined property indicating a range. In this case, the predicate "rdfs:range" indicates the class that can be the object of "<worksAt>". Furthermore, in the example illustrated in FIG. 7, the ontology information TID102 indicates that the object is "<organization>", i.e., an organization. In this way, in the example illustrated in FIG. 7, the ontology information TID102 defines that the classes that are lower than the class "<organization>" can be used for the object of "<worksAt>".

Furthermore, in the example illustrated in FIG. 7, the ontology information TID201 identified by the ontology ID "TID201" indicates that the subject is "<ceo>", i.e., a CEO. Furthermore, in the example illustrated in FIG. 7, the ontology information TID201 indicates that the predicate is "rdfs:subClassOf", i.e., a predetermined property. For example, the predicate "rdfs:subClassOf" indicates that the value associated with the subject is the member of the class associated with the object, i.e., a subclass (lower level class). Furthermore, in the example illustrated in FIG. 7, the ontology information TID201 indicates that the object is "<officer>", i.e., an officer. In this way, in the example illustrated in FIG. 7, the ontology information TID201 defines that "<officer>" is the lower level class (lower level concept) of "<ceo>".

Furthermore, in the example illustrated in FIG. 7, the ontology information TID501 identified by the ontology ID "TID501" indicates that the subject is "<Jim>", i.e., a predetermined person "Jim". Furthermore, in the example illustrated in FIG. 7, the ontology information TID501 indicates that the predicate is "rdf:type", i.e., a predetermined property. For example, the predicate "rdf:type" indicates that the value associated with the subject is the instance of the class associated with the object. Furthermore, in the example illustrated in FIG. 7, the ontology information TID501 indicates that the object is "<ceo>", i.e., a CEO. In this way, in the example illustrated in FIG. 7, the ontology information TID501 defines that "<Jim>" is the instance of "<ceo>", i.e., "Jim is a CEO".

Furthermore, in addition to the information described above, the ontology information storage unit 123 may also store therein various kinds of information in accordance with purposes. For example, the ontology information storage unit 123 may also store therein triple information associated with specific meaning.

Target Triple Information Storage Unit 124

The target triple information storage unit 124 according to the embodiment stores therein various kinds of information related to target triple. For example, the second triple information SID32 stores therein, as the target triple, the second triple selected in the selecting process. The target triple information storage unit 124 illustrated in FIG. 8 has items, such as "target triple ID (the second triple ID)", "Subject (node ID)", "Predicate (edge ID)", "Object (node ID)", "statistical information", and the like.

The "target triple ID (the second triple ID)" indicates the identification information for identifying the triple information. Furthermore, the "Subject (node ID)" indicates the value and the node ID that are associated with the subject in the triple information identified by the target triple ID. Furthermore, the "Predicate (edge ID)" indicates the value and the edge ID associated with the predicate in the triple information identified by the second triple ID. Furthermore, the "Object (node ID)" indicates the value and the node ID that are associated with the object of the triple information identified by the second triple ID. In the example illustrated in FIG. 8, from among the pieces of data associated with the "Subject (node ID)", the "Predicate (edge ID)", and the "Object (node ID)", the portion surrounded by "<" and ">" corresponds to each value and the portion surrounded by "(" and ")" corresponds to each ID.

Furthermore, in the "statistical information", the item, such as "count value", and the like is included. In the "count value", the count value that is based on the number of pieces of the first triple information associated with the triple information identified by the second triple ID is stored.

In the example illustrated in FIG. 8, the target triple information storage unit 124 stores therein the triple information, such as the second triple information SID25 identified by the target triple ID "SID25", the second triple information SID31 identified by the target triple ID "SID31", and the like.

In the example illustrated in FIG. 8, the second triple information SID32 identified by the target triple ID "SID32" indicates that the subject is "<engineer>", i.e., an engineer. Furthermore, the second triple information SID32 indicates that the node ID of the subject "<engineer>" in the second triple information SID32 is "N16".

Furthermore, the second triple information SID32 indicates that the predicate is "<worksAt>", i.e., the predicate having the meaning of "works at". Furthermore, the second triple information SID32 indicates that the edge ID of the predicate "<worksAt>" in the second triple information SID32 is "p20".

Furthermore, the second triple information SID32 indicates that the object is "<organization>", i.e., an organization. Furthermore, the second triple information SID32 indicates that the node ID of the object "<organization>" in the second triple information SID32 is "N21". Furthermore, the second triple information SID32 indicates that the count value of the second triple information SID32 is "200".

Furthermore, in addition to the information described above, the target triple information storage unit 124 may also store therein various kinds of information in accordance with purposes.

Graph Information Storage Unit 125

The graph information storage unit 125 according to the embodiment stores therein various kinds of information related to a graph. FIG. 9 is a diagram illustrating an example of the graph information storage unit according to the embodiment. The graph information storage unit 125 illustrated in FIG. 9 has items, such as "edge ID (predicate edge)", "node ID", and the like. The "node ID" has items, such as "subject node (link source)", "object node (link destination)", and the like.

The "edge ID (predicate edge)" indicates the identification information for identifying the edge included in the graph. Furthermore, the "subject node (link source)" indicates the identification information for identifying the node (subject node) that becomes the link source of the edge. Furthermore, the "object node (link destination)" indicates the identification information for identifying the node (object node) that becomes the link destination of the edge.

In the example illustrated in FIG. 9, an edge p1 identified by the edge ID "p1" indicates that a link is constituted between a node N3 serving as the subject node and the node N1 serving as the object node. Namely, the edge p1 is linked starting from the node N3 toward the node N1.

Furthermore, in addition to the information described above, the graph information storage unit 125 may also store therein various kinds of information in accordance with purposes.

Cluster Information Storage Unit 126

Figure 10:
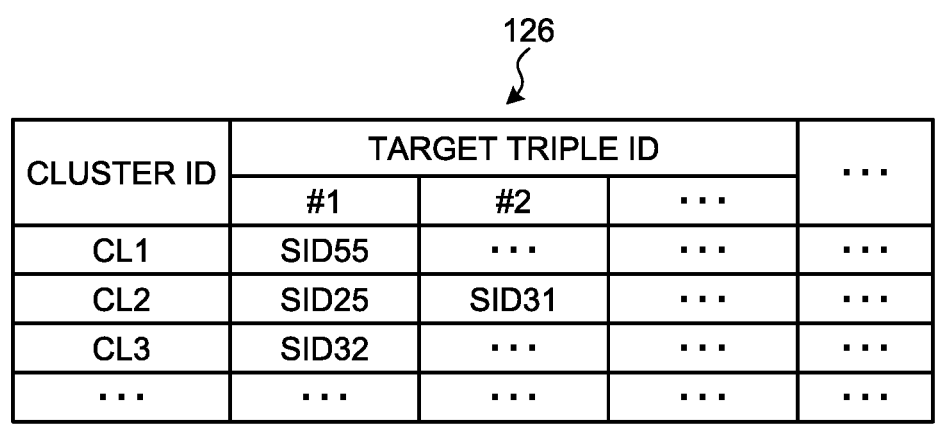
FIG. 10 is a diagram illustrating an example of a cluster information storage unit according to the embodiment.

The cluster information storage unit 126 according to the embodiment stores therein various kinds of information related to clustering. FIG. 10 is a diagram illustrating an example of the cluster information storage unit according to the embodiment. The cluster information storage unit 126 illustrated in FIG. 10 has items, such as "cluster ID", "target triple ID", and the like. The "target triple ID" has items, such as "#1", "#2", and the like.

The "cluster ID" indicates the identification information for identifying the cluster. Furthermore, the "target triple ID" indicates the second triple information belonging to the associated cluster.

The example illustrated in FIG. 10 indicates that the second triple information SID55 and the like belong to the cluster CL1 identified by the cluster ID "CL1". Furthermore, the example illustrated in FIG. 10 indicates that the second triple information SID25, the second triple information SID31, and the like belong to the cluster CL2 identified by the cluster ID "CL2".

Furthermore, in addition to the information described above, the cluster information storage unit 126 may also store therein various kinds of information in accordance with purposes.

Control Unit 130

A description will be given here by referring back to FIG. 4. The control unit 130 is a controller and is implemented by, for example, a central processing unit (CPU), a micro processing unit (MPU), or the like, executing various kinds of programs (corresponding to an example of an information processing program), which are stored in a storage device in the information processing apparatus 100, by using a RAM as a work area. Furthermore, the control unit 130 is a controller and is implemented by, for example, an integrated circuit, such as an application specific integrated circuit (ASIC), a field programmable gate array (FPGA), or the like.

As illustrated in FIG. 4, the control unit 130 includes an acquiring unit 131, a selecting unit 132, a generating unit 133, and a providing unit 134 and implements or executes the function or the operation of the information processing described below. Furthermore, the internal configuration of the control unit 130 is not limited to the configuration illustrated in FIG. 4 and another configuration may also be used as long as the configuration in which the information processing described below is performed.

Acquiring Unit 131

The acquiring unit 131 acquires various kinds of information. The acquiring unit 131 acquires various kinds of information from an external information processing apparatus, such as the terminal device 10, the information providing device 50, and the like. For example, the acquiring unit 131 acquires various kinds of information from the first triple information storage unit 121, the second triple information storage unit 122, the ontology information storage unit 123, the target triple information storage unit 124, the graph information storage unit 125, the cluster information storage unit 126, and the like. Furthermore, the acquiring unit 131 may also acquire various kinds of information from an external information processing apparatus. Furthermore, the acquiring unit 131 may also acquire information related to each of the pieces of the triple information from the information providing device 50.

The acquiring unit 131 acquires a plurality of pieces of the second triple information hierarchized based on the conceptual system in the plurality of pieces of the first triple information that indicate the relationship about three types of elements and acquires statistical information that indicates the number of pieces of the first triple information associated with each of the plurality of pieces of the second triple information.

For example, the acquiring unit 131 acquires the plurality of pieces of the first triple information indicating the relationship about the three types of elements and acquires the plurality of pieces of the second triple information that are based on the conceptual system in the plurality of pieces of the first triple information. For example, the acquiring unit 131 acquires the plurality of pieces of the first triple information from the first triple information storage unit 121. Furthermore, for example, the acquiring unit 131 acquires the plurality of pieces of the second triple information from the second triple information storage unit 122. For example, the acquiring unit 131 acquires the plurality of pieces of the second triple information that are hierarchized based on the information related to a predetermined conceptual system.

The acquiring unit 131 acquires the second triple information indicated by the second triple information storage unit 122 illustrated in FIG. 1. The acquiring unit 131 may also acquire the second triple information from the storage unit 120 (see FIG. 4) or may also acquire the second triple information from the information providing device 50 (see FIG. 3).

The acquiring unit 131 acquires the target triple information indicated by the target triple information storage unit 124 illustrated in FIG. 2. The acquiring unit 131 may also acquire the target triple information from the storage unit 120 (see FIG. 4) or may also acquire the target triple information from the information providing device 50 (see FIG. 3).

Selecting Unit 132

The selecting unit 132 selects various kinds of information. For example, the selecting unit 132 performs various kinds of selection based on the information stored in the first triple information storage unit 121, the second triple information storage unit 122, the ontology information storage unit 123, the target triple information storage unit 124, the graph information storage unit 125, the cluster information storage unit 126, and the like. For example, the selecting unit 132 performs various processing processes based on the information acquired by the acquiring unit 131. The selecting unit 132 extracts various kinds of information. For example, the selecting unit 132 extracts triple information.

Based on the statistical information acquired by the acquiring unit 131 and based on the predetermined standard related to the statistical information, the selecting unit 132 selects, from among the plurality of pieces of the second triple information, the plurality of pieces of the target triple information that are used for the clustering process. The selecting unit 132 selects a plurality of pieces of the target triple information based on a comparison between each of the pieces of the statistical information of the pieces of the second triple information and a predetermined threshold that is the predetermined standard.

The selecting unit 132 selects a plurality of pieces of target triple information based on the predetermined threshold that is calculated from the number of plurality of pieces of the first triple information and the value related to the number of clusters. If the statistical information of one of the pieces of the second triple information is less than the predetermined threshold and if the statistical information of one of the other pieces of the second triple information in a hierarchy of a higher level concept with respect to the one of the pieces of the second triple information is equal to or greater than the predetermined threshold, the selecting unit 132 selects the one of the pieces of the second triple information as the target triple information. If the statistical information of the one of the pieces of the second triple information is less than the predetermined threshold and if the statistical information of one of the other pieces of the second triple information that is directly linked to the node of the one of the pieces of the second triple information is equal to or greater than the predetermined threshold, the selecting unit 132 selects the one of the pieces of the second triple information as the target triple information.

In the example illustrated in FIG. 1, the selecting unit 132 searches for the second triple information. The selecting unit 132 searches the hierarchy diagram STH1-1 illustrated in FIG. 1. For example, the selecting unit 132 searches the hierarchy diagram STH1-1 in order to select, from among the pieces of the second triple information, the target triple information that is used for the clustering process. The selecting unit 132 selects the target triple information. The selecting unit 132 selects the target triple information based on the statistical information of the second triple information and based on the predetermined standard. In the example illustrated in FIG. 1, the selecting unit 132 uses the threshold "1000" indicated by the threshold TINF as the predetermined standard and select the target triple information.

For example, the selecting unit 132 compares the count value of the second triple information with the threshold TINF that is the threshold "1000" and selects the target triple information based on the obtained comparison result. For example, the selecting unit 132 sequentially searches the hierarchy diagram STH1-1 for the pieces of the second triple information in the order from the top level hierarchy and selects, as the target triple information, the second triple information located at the position in which the count value is below the threshold TINF first time. For example, the selecting unit 132 sequentially searches the hierarchy diagram STH1-1 in the order from the top level hierarchy toward the direction of the lower level concept (in the downward direction) and selects, as the target triple information, the second triple information located at the position in which the count value is below the threshold TINF first time.

The selecting unit 132 selects, as indicated by the hierarchy diagram STH1-2, target triple information based on the statistical information of the second triple information and based on the threshold TINF. In the example illustrated in FIG. 1, as indicated by target triple list SINF1, the selecting unit 132 selects, as the target triple information, the second triple information SID25, the second triple information SID31, the second triple information SID32, the second triple information SID55, and the like. As indicated by the target triple list SINF1, the selecting unit 132 selects, as the target triple information, the second triple information in which the count value is less than the threshold "1000".

Generating Unit 133

The generating unit 133 generates various kinds of information. The generating unit 133 performs various kinds of generating operations based on the information stored in the first triple information storage unit 121, the second triple information storage unit 122, the ontology information storage unit 123, the target triple information storage unit 124, the graph information storage unit 125, the cluster information storage unit 126, and the like. The generating unit 133 performs various generating processes based on the information acquired by the acquiring unit 131. The generating unit 133 calculates various kinds of information. The generating unit 133 calculates the statistical information related to the triple information.

The generating unit 133 generates, based on the elements included in each of the plurality of pieces of the target triple information selected by the selecting unit 132, the relationship information indicating the relationship between the pieces of the target triple information. The generating unit 133 generates the relationship information based on commonality of the element included in each of the pieces of the target triple information. The generating unit 133 generates the relationship information based on each of the pieces of the statistical information of the plurality of pieces of the target triple information. The generating unit 133 generates, as the relationship information, the information related to the distance between the pieces of the target triple information.

The generating unit 133 generates, based on the relationship information, cluster information (clustering information) obtained by performing clustering on a plurality of pieces of the target triple information. The generating unit 133 generates the cluster information such that the pieces of the target triple information having a closer relationship that is based on the relationship information are clustered into the same cluster.

The generating unit 133 generates the relationship information based on the graph information that includes nodes indicating predetermined types of elements and edges that link nodes from among the three types of elements in the plurality of pieces of the target triple information. The generating unit 133 generates the relationship information based on the graph information in which the element of the subject or the object is used as a node and the predicate is used as an edge from among the three types of elements in the plurality of pieces of the target triple information.

The generating unit 133 generates relationship information based on the graph information in which the node associated with the subject included in one of the pieces of the target triple information and the node associated with the object included in the one of the pieces of the target triple information are linked by the edge associated with the predicate included in the one of the pieces of the target triple information. The generating unit 133 generates the relationship information based on the graph information that includes one of the other edges that links the nodes in each of which the element associated with the node has a predetermined conceptual relationship. The generating unit 133 generates the relationship information based on the graph information that includes the other edges each of which links the nodes in each of which the associated element with the node that has a higher/lower level concept.

Based on the link relation between the first target triple information and the second target triple information, the generating unit 133 generates the relationship information indicating the relationship between the first target triple information and the second target triple information. The generating unit 133 generates the relationship information based on the other pieces of the target triple information included on the route having the minimum number of edges between the first target triple information and the second target triple information. The generating unit 133 generates the relationship information based on the other pieces of the target triple information included on the route having the minimum number of edges that are included between the first node associated with the first target triple information and the second node associated with the second target triple information. The generating unit 133 generates the relationship information based on the other pieces of the target triple information included on the route having the minimum number of edges that are included between the first edge associated with the first target triple information and the second edge associated with the second target triple information. The generating unit 133 generates the relationship information based on the statistical information of the first target triple information, the statistical information of the second target triple information, and the statistical information of the other pieces of the target triple information. The generating unit 133 generates the relationship information based on the number of the other pieces of the target triple information.

The generating unit 133 calculates, based on the number of pieces of the first triple information associated with each of the plurality of pieces of the second triple information, the statistical information related to the plurality of pieces of the first triple information. The generating unit 133 calculates the statistical information by using the second triple information indicating the relationship related to the three types of elements that are each of classes or higher level classes of the three types of elements in one of the pieces of the first triple information as the second triple information associated with one of the pieces of the first triple information. Furthermore, the generating unit 133 calculates the statistical information by using the second triple information indicating the relationship related to the three types of elements that are in the class of one of the elements included in one of the pieces of the first triple information and that are in each of the classes or higher level classes of the other two elements as the second triple information associated with the one of the pieces of the first triple information.

The generating unit 133 calculates the statistical information by using the second triple information indicating the relationship related to the three types of elements that are in the class of the element of a predicate in one of the pieces of the first triple information and that are each of the classes or the higher level classes of the elements of a subject and an object as the second triple information associated with the one of the pieces of the first triple information. The generating unit 133 calculates the statistical information by using, based on the third triple information indicating the domain and the range related to the predicate in one of the pieces of the first triple information, the second triple information in which the element of the subject is included between the class of the subject in one of the pieces of the first triple information and the domain and the element of the object is included between the class of the object in one of the pieces of the first triple information and the range as the second triple information associated with one of the pieces of the first triple information.

The generating unit 133 calculates the statistical information related to the plurality of pieces of the first triple information based on each of a plurality of nodes that includes the node associated with the element of the subject in one of the pieces of the first triple information and that is included in a region between the node associated with the element of the subject and the node associated with the domain from among the plurality of nodes that are linked in accordance with the hierarchical relationship between each of the nodes. Furthermore, the generating unit 133 calculates the statistical information related to the plurality of pieces of the first triple information based on the nodes included in a region between the node associated with the domain and the node at a predetermined number of stages from among the nodes.

The generating unit 133 calculates the statistical information related to the plurality of pieces of the first triple information based on each of the plurality of nodes that includes the node associated with the element of the object in one of the pieces of the first triple information and that is included in a region between the node associated with the element of the object and the node associated with the range from among the plurality of nodes that are linked in accordance with the hierarchical relationship between each of the nodes. Furthermore, the generating unit 133 calculates the statistical information related to the plurality of pieces of the first triple information based on the nodes included in a region between the node associated with the range and the node at a predetermined number of stages from among the nodes.

In the example illustrated in FIG. 1, the generating unit 133 generates a hierarchy diagram indicating the hierarchical relationship between the pieces of the second triple information. The generating unit 133 generates the hierarchy diagram STH1-1 indicating the hierarchical relationship between the pieces of the second triple information based on the information stored in the second triple information storage unit 122. The generating unit 133 generated the hierarchy diagram STH1-1 by using the hierarchy information stored in the second triple information storage unit 122.

The generating unit 133 generates graph information by using the target triple information. The generating unit 133 generates a skeleton graph GINF11 based on the target triple information storage unit 124. For example, the generating unit 133 generates the skeleton graph GINF11 in which the subject and the object included in each of the pieces of target triple information are used as nodes and the predicate in each of the pieces of target triple information is used as an edge.

The generating unit 133 generates relationship information indicating the relationship between the pieces of target triple information. In the example illustrated in FIG. 2, the generating unit 133 calculates the distance between the pieces of the target triple information as the relationship information. For example, the generating unit 133 calculates the distance based on information (path information) related to a path (route) between the pieces of target triple information. For example, based on the path information between two pieces of the target triple information, the generating unit 133 calculates the distance between the two pieces of the target triple information. For example, based on the number of edges on the route between the two pieces of the target triple information that become the calculation target, the generating unit 133 calculates the distance between the two pieces of the target triple information. For example, based on a count value of the target triple information on the route between two pieces of the target triple information that become the calculation target, the generating unit 133 calculates the distance between the two pieces of the target triple information.

For example, based on a calculation formula in which the number of edges on the route between two pieces of the target triple information that become the calculation target is the denominator, the generating unit 133 calculates the distance between the two pieces of the target triple information. Furthermore, the edge of the two pieces of the target triple information may also be included in the edge on the route between the two pieces of target triple information. For example, in a case of the second triple information constituted by the node N8, the edge p9, and the node N15 and the second triple information SID31, the generating unit 133 calculates the distance assuming that the number of edges on the route is "2".

For example, based on the calculation formula in which the sum total of the count values of the target triple information on the route between two pieces of target triple information that become the calculation target is the numerator, the generating unit 133 calculates the distance between the two pieces of the target triple information. Furthermore, the two pieces of the target triple information themselves may also be included in the target triple information on the route between the two pieces of target triple information. For example, in a case of the second triple information (the second triple information SIDX) constituted by the node N8, the edge p9, and the node N15 and the second triple information SID31, the generating unit 133 calculates the distance by using the total value of the count value of the second triple information SIDX and the count value of the second triple information SID31.

For example, in a case of the second triple information SID31 and the second triple information SID32, the generating unit 133 calculates the distance assuming that the number of edges on the route is "4". For example, the generating unit 133 calculates the distance assuming that the number of edges on the route is "4" associated with the edges p10, p9, p15, and p20. For example, in a case of the second triple information SID31 and the second triple information SID32, the generating unit 133 calculates the distance by using the total value of the count value of the second triple information SID31; the count value of the second triple information constituted by the node N8, the edge p9, and the node N15; the count value of the second triple information constituted by the node N15, the edge p15, and the node N16; and the count value of the second triple information SID32.

For example, the generating unit 133 may also calculate the distance by using equation represented by "distance=− (total value of count value/number of edges)" or the like. For example, the generating unit 133 may also calculate the distance by multiplying negative one by a value obtained by dividing the total value of the count values by the number of edges. If there is no route between two pieces of the target triple information, the generating unit 133 may also calculate the distance between the two pieces of the target triple information as a predetermined maximum value. If there is no route between two pieces of the target triple information, the generating unit 133 may also calculate the distance between the two pieces of the target triple information as "0". If two pieces of the target triple information are not linked, the generating unit 133 may also calculate the distance between the two pieces of the target triple information as "0".

The generating unit 133 performs clustering. The generating unit 133 generates cluster information by performing clustering on the selected target triple information. The generating unit 133 generates the cluster information CLINF11 by performing clustering on the target triple information. The generating unit 133 performs clustering on the target triple information included in the skeleton graph GINF11. In the example illustrated in FIG. 2, the generating unit 133 performs clustering on a plurality of pieces of the target triple information by using a predetermined clustering method. For example, the generating unit 133 may also perform clustering on a plurality of pieces of the target triple information by appropriately using various conventional technologies. The generating unit 133 may also use various clustering methods, such as logistic regression using k-means or a Dirichlet process.

In the example illustrated in FIG. 2, the generating unit 133 performs clustering such that each of the pieces of the target triple information are clustered into clusters CL1 to CL3 and the like. For example, the generating unit 133 performs clustering such that the second triple information SID31 is classified into the cluster CL2. For example, the generating unit 133 performs clustering such that the second triple information SID32 is clustered into the cluster CL3.

Providing Unit 134

The providing unit 134 provides various kinds of information. For example, the providing unit 134 provides various kinds of information to external information processing apparatuses, such as the terminal device 10, the information providing device 50, and the like. The providing unit 134 sends various kinds of information to the terminal device 10. The providing unit 134 distributes various kinds of information to the terminal devices 10. The providing unit 134 provides various sorts of information based on the various kinds of information acquired by the acquiring unit 131. The providing unit 134 provides various sorts of information based on the various kinds of information selected by the selecting unit 132. The providing unit 134 provides a plurality of pieces of information based on the target triple information selected by the selecting unit 132. The providing unit 134 provides various sorts of information based on the various kinds of information generated by the generating unit 133.

The providing unit 134 provides various sorts of information based on the various kinds of information generated by the generating unit 133. For example, the providing unit 134 provides the information indicating the target triple information that has been selected by the selecting unit 132 to the terminal device 10. For example, the providing unit 134 provides the statistical information calculated by the generating unit 133 to the terminal device 10. For example, the providing unit 134 provides the cluster information generated by the generating unit 133 to the terminal device 10.

4. Generation of Statistical Information

Figure 12:
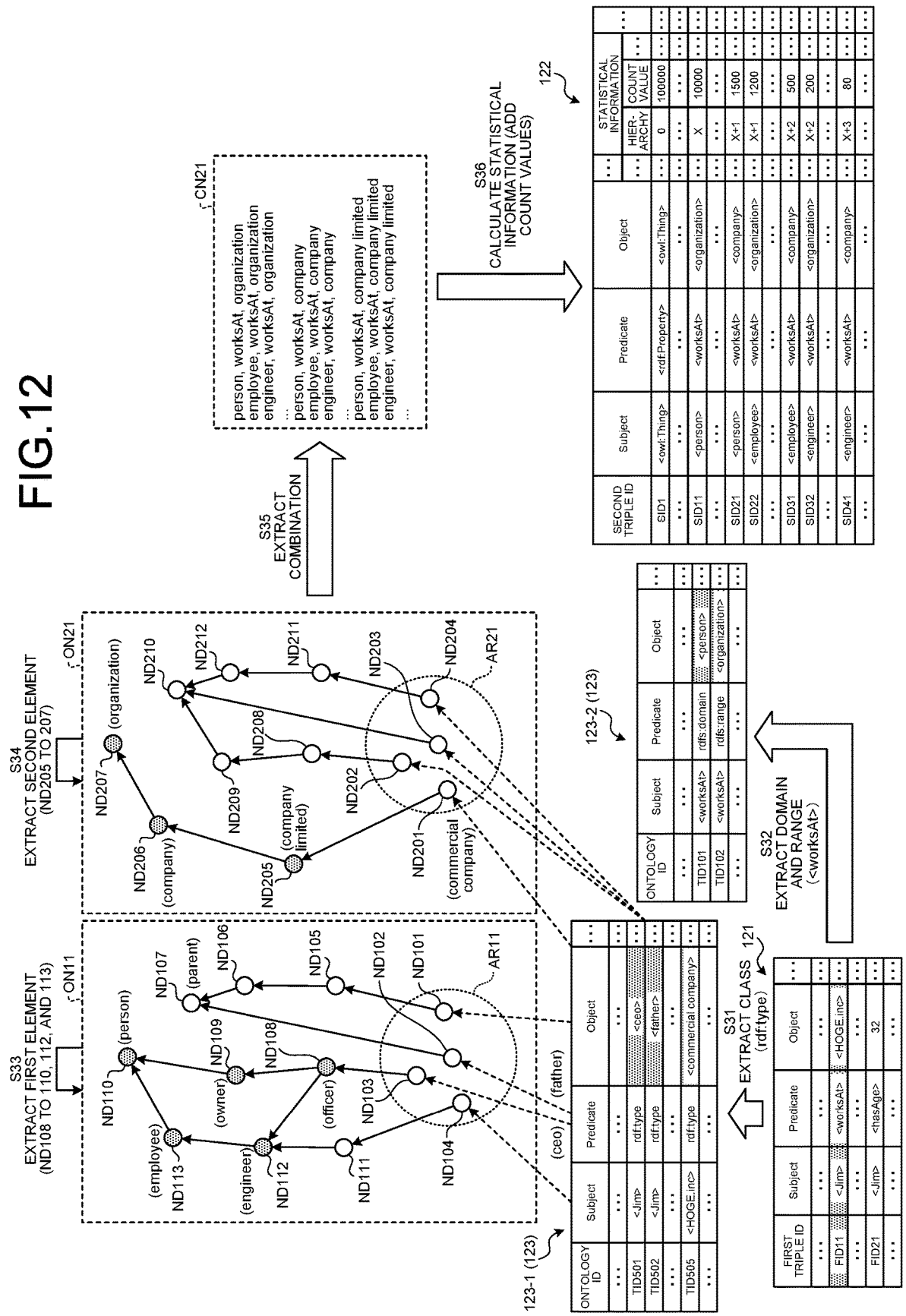
FIG. 12 is a diagram illustrating an example of generating statistical information according to the embodiment.

In the following, an example of generating statistical information according to the embodiment will be described with reference to FIG. 12. FIG. 12 is a diagram illustrating an example of generating the statistical information according to the embodiment. FIG. 12 indicates a case in which the information processing apparatus 100 (see FIG. 4) calculates the statistical information related to the triple information stored in the first triple information storage unit 121. The example illustrated in FIG. 12 indicates an example in which the information processing apparatus 100 calculates the statistical information, by using as a target, of the first triple information FID11 associates with concrete meaning of "Jim works at HOGE, Inc.". Furthermore, descriptions of the same points as those described in FIG. 1 or FIG. 2 will appropriately be omitted.

First, as illustrated in FIG. 12, the information processing apparatus 100 extracts information related to the class of the target first triple information (Step S31). In the example illustrated in FIG. 12, the information processing apparatus 100 extracts information related to the class of the first triple information FID11. For example, the information processing apparatus 100 extracts the information on the class of the first triple information FID11 from the ontology information storage unit 123.

In the ontology information storage unit 123 illustrated in FIG. 12, information or the like related to the definition of each entity (substance) or the like in predetermined ontology (conceptual system) is stored. For example, the ontology information storage unit 123 stores therein the information related to the definition of words in the conceptual system of a so-called RDF schema or the like. Furthermore, the ontology information storage unit 123 illustrated in FIG. 12 is associated with the ontology information storage unit 123 illustrated in FIG. 7 and only the part related to the explanation of FIG. 12 is illustrated. In the example illustrated in FIG. 12, in order to illustrate only the part associated with the explanation, two tables are illustrated as ontology information storage units 123-1 and 123-2; however, it is assumed that the ontology information storage units 123-1 and 123-2 illustrated in FIG. 12 are the same as the ontology information storage unit 123. Furthermore, the ontology information storage units 123-1 and 123-2 are collectively referred to as the ontology information storage unit 123 as long as the ontology information storage units 123-1 and 123-2 need not be distinguished.

For example, the ontology information storage unit 123 illustrated in FIG. 12 includes items, such as "ontology ID", "Subject", "Predicate", "Object", and the like.

Furthermore, the ontology information TID501 identified by the ontology ID "TID501" indicated in the ontology information storage unit 123-1 illustrated in FIG. 12 indicates that the subject is "<Jim>". Furthermore, for example, the ontology information TID501 indicated in the ontology information storage unit 123-1 illustrated in FIG. 12 indicates that the predicate is "rdf:type", i.e., a predetermined property. For example, this indicates that the predicate "rdf:type" is the instance in the class in which the value associated with the subject is associated with the object. Furthermore, for example, the ontology information TID501 indicated in the ontology information storage unit 123-1 illustrated in FIG. 12 indicates that the object is "<ceo>", i.e., a CEO. In this way, in the example illustrated in FIG. 12, the ontology information TID501 defines that "<Jim>" is the instance of "<ceo>", i.e., "Jim is a CEO".

Furthermore, the ontology information TID502 identified by the ontology ID "TID502" indicated in the ontology information storage unit 123-1 illustrated in FIG. 12 indicates that the subject is "<Jim>". Furthermore, for example, the ontology information TID502 indicated in the ontology information storage unit 123-1 illustrated in FIG. 12 indicates that the predicate is "rdf:type". Furthermore, for example, the ontology information TID502 indicated in the ontology information storage unit 123-1 illustrated in FIG. 12 indicates that the object is "<father>", i.e., a father. In this way, in the example illustrated in FIG. 12, the ontology information TID502 defines that "<Jim>" is the instance of "<father>", i.e., "Jim is a father".

Furthermore, the ontology information TID505 identified by the ontology ID "TID505" indicated in the ontology information storage unit 123-1 illustrated in FIG. 12 indicates that the subject is "<HOGE.inc>". Furthermore, for example, the ontology information TID505 indicated in the ontology information storage unit 123-1 illustrated in FIG. 12 indicates that the predicate is "rdf:type". Furthermore, for example, the ontology information TID505 indicated in the ontology information storage unit 123-1 illustrated in FIG. 12 indicates that the object is "<commercial company>", i.e., a commercial company corporation. In this way, in the example illustrated in FIG. 12, the ontology information TID505 defines that "<HOGE.inc>" is the instance of "<commercial company>", i.e., "HOGE, Inc." is a commercial company corporation".

As described above, in a case where the "ontology information TID* (* is an arbitrary numerical value)" is described, this indicates that the subject ontology information is the triple information identified by the ontology ID "TID*". For example, in a case where the "ontology information TID502" is described, the subject triple information is the triple information identified by the ontology ID "TID502".

Furthermore, an object (hereinafter, also referred to as a "term") included in the ontology information stored in the ontology information storage unit 123 has a graph structure indicating a hierarchical conceptual system indicated by graph information ON11 and graph information ON21 illustrated in FIG. 12. Furthermore, any object may also be used for the term mentioned here as long as the object is a conceptual linguistic representation and any object may also be used regardless of, for example, an abstract object, a concreate object, a part of speech associated with the subject linguistic representation, or the like. Furthermore, for example, the "term" mentioned here is defined as a "Universal Resource Identifier (URI)" in the RDF data model. For example, in the RDF data model, uniqueness in the Semantic Web technology is implemented by associating an identifier (mechanical address, etc.) with each of the concepts. Nodes ND101 to ND113 indicated in the graph information ON11 and nodes ND201 to ND212 indicated in the graph information ON21 illustrated in FIG. 12 are associated with each of the terms of the ontology information stored in the ontology information storage unit 123. Hereinafter, the nodes ND101 to ND113 and the nodes ND201 to ND212 are collectively referred to as the "node ND" if the nodes need not be distinguished.

Furthermore, in FIG. 12, graph information ON11 indicating the graph structure in which the search related to the subject "<Jim>" is performed and graph information ON21 indicating the graph structure in which the search related to the object "<HOGE.inc>" is performed as separately illustrated; however, the pieces of the graph information ON11 and ON21 are part of the conceptual system constituted based on the ontology information stored in the ontology information storage unit 123. Namely, a common node ND may also be included in both the graph information ON11 and the graph information ON21 or the nodes ND in the graph information ON11 and the nodes ND in the graph information ON21 may also be connected by arrows.

Each of the arrow lines that connect between each of the nodes ND indicated by the graph information ON11 and the graph information ON21 illustrated in FIG. 12 indicates that a relationship of a higher level class and a lower level class is present between the terms associated with the linked nodes. Specifically, the term associated with the node on the side of the starting point of the arrow line indicates the lower level class and the term associated with the node on the side of the head of the arrow indicates the higher level class. For example, the graph information ON11 indicates that the term "<person>" associated with a node ND110 is in the higher level class of the term "<employee>" associated with a node ND113. Furthermore, in FIG. 12, a description of "< >" will be appropriately omitted. Furthermore, only a part of the nodes ND needed for a description is illustrated in the graph information ON11 and the graph information ON21 in FIG. 12. For example, in the node ND110 associated with the term "<person>", the nodes ND associated with various kinds of lower level classes (lower level concepts) other than the two nodes ND, i.e., the nodes ND109 and ND113, may also be included.

For example, the ontology information TID231 stored in the ontology information storage unit 123 (see FIG. 7) indicates that the subject is "<employee>", i.e., an employee. Furthermore, for example, the ontology information TID231 indicates that the predicate is "rdfs:subClassOf", i.e., a predetermined property. For example, the predicate "rdfs:subClassOf" indicates that the value associated with the subject is a member of the class associated with the object, i.e., a subclass (lower level class). Furthermore, for example, the ontology information TID231 indicates that the object is "<person>". Namely, the ontology information TID231 indicates that "<employee>" is the lower level class of "<person>". In other words, the ontology information TID231 indicates that an "employee" is the lower level concept of a "person".

For example, the information processing apparatus 100 extracts, based on the ontology information TID231 described above, the relationship of the arrow in which the node ND113 associated with the term "<employee>" included in the graph information ON11 is the starting point and the node ND110 associated with the term "<person>" is the head of the arrow.

Furthermore, for example, the ontology information TID201 stored in the ontology information storage unit 123 (see FIG. 7) indicates that the subject is "<ceo>", i.e., a CEO. Furthermore, for example, the ontology information TID201 indicates that the predicate is "rdfs:subClassOf". Furthermore, for example, the ontology information TID201 indicates that the object is "<officer>", i.e., an officer. Namely, the ontology information TID201 indicates that "<ceo>" is the lower level class of "<officer>". In other words, the ontology information TID231 indicates that a "CEO" is the lower level concept of an "officer".

For example, the information processing apparatus 100 extracts, based on the ontology information TID201 described above, the relationship of the arrow in which a node ND103 associated with the term "<ceo>" included in the graph information ON11 is the starting point and a node ND108 associated with the term "<officer>" is the head of the arrow. In this way, the information processing apparatus 100 extracts, based on the ontology information stored in the ontology information storage unit 123, the graph structure indicated in the graph information ON11 and the graph information ON21.

In the example illustrated in FIG. 12, the information processing apparatus 100 extracts the ontology information in which the subject "<Jim>" is the subject and the predicate is "rdf:type" included in the first triple information FID11 from the ontology information storage unit 123. Furthermore, in the example illustrated in FIG. 12, the information processing apparatus 100 extracts the ontology information in which the object "<HOGE.inc>" in the first triple information FID11 is the subject and the predicate is "rdf:type" from the ontology information storage unit 123. Specifically, the information processing apparatus 100 extracts the pieces of the ontology information TID501, TID502, TID505, and the like from the ontology information storage unit 123.

For example, the information processing apparatus 100 specifies that "<Jim>" is the instance of "<ceo>" based on the extracted ontology information TID501. Consequently, the information processing apparatus 100 extracts the information indicating that "<ceo>" is the class of "<Jim>" from the ontology information storage unit 123. Furthermore, for example, the information processing apparatus 100 specifies that "<Jim>" is the instance of "<father>" based on the extracted ontology information TID502. Consequently, the information processing apparatus 100 extracts the information indicating that "<father>" is the class of "<Jim>" from the ontology information storage unit 123. Furthermore, although not illustrated, the information processing apparatus 100 specifies that, based on the other pieces of the extracted ontology information, for example, "<American>", i.e., an American, is the class of "<Jim>".

The information processing apparatus 100 extracts the node ND associated with the information related to the class of "<Jim>". In the example illustrated in FIG. 12, the information processing apparatus 100 extracts the nodes ND associated with "<ceo>", "<father>", and the like that is the class of "<Jim>". In the example illustrated in FIG. 12, as indicated in an area AR11 in the graph information ON11, the information processing apparatus 100 extracts four nodes ND101 to ND104 including the node ND103 that is associated with the term "<ceo>" and the node ND102 that is associated with the term "<father>".

Furthermore, for example, the information processing apparatus 100 specifies that, based on the extracted ontology information TID505, "<HOGE.inc>" is the instance of "<commercial company>". Consequently, the information processing apparatus 100 extracts the information indicating that "<commercial company>" is the class of "<HOGE.inc>" from the ontology information storage unit 123.

The information processing apparatus 100 extracts the node ND associated with the information related to the class of "<HOGE.inc>". In the example illustrated in FIG. 12, the information processing apparatus 100 extracts the node ND associated with "<commercial company>" or the like that is the class of "<HOGE.inc>". In the example illustrated in FIG. 12, as indicates in an area AR21 in the graph information ON21, the information processing apparatus 100 extracts four nodes ND201 to ND204 including a node ND201 that is associated with the term "<commercial company>".

Then, the information processing apparatus 100 extracts the information related to the class of "<Jim>" by tracing the higher level class from the four nodes ND101 to ND104 in the graph information ON11. Furthermore, the information processing apparatus 100 extracts the information related to the class of "<HOGE.inc>" by tracing the higher level class from the four nodes ND201 to ND204 in the graph information ON21.

Here, the information processing apparatus 100 extracts, from the ontology information storage unit 123, the information that is used to specify the region of a search performed starting from the four nodes ND101 to ND104 included in the graph information ON11 or the four nodes ND201 to ND204 included in the graph information ON21 (Step S32). In the example illustrated in FIG. 12, the information processing apparatus 100 extracts, based on the predicate "<worksAt>" in the first triple information FID11, the information that is used to specify the region of a search performed starting from the four nodes ND101 to ND104 included in the graph information ON11 of the four nodes ND201 to ND204 included in the graph information ON21.

For example, as indicated by the ontology information storage unit 123-2 illustrated in FIG. 12, the ontology information TID101 indicates that the subject is "<worksAt>". Furthermore, for example, the ontology information TID101 indicates that the predicate is "rdfs:domain", i.e., a predetermined property indicating a domain. In this case, the predicate "rdfs:domain" indicates the class that can be the subject of "<worksAt>". Furthermore, for example, the ontology information TID101 indicates that the object is "<person>", i.e., a person. Namely, the ontology information TID101 indicates that the classes lower than the class "<person>" can be the subject of "<worksAt>". Namely, as the subject of "<worksAt>", the term "<person>" is the top level concept. Furthermore, a plurality of pieces of the ontology information in which the subject is "<worksAt>" and the predicate is "rdfs:domain", i.e., a plurality of pieces of the ontology information indicating the domain of "<worksAt>" may also be present.

Consequently, the information processing apparatus 100 decides the region of a search performed starting from the four nodes ND101 to ND104 included in the graph information ON11 is up to the node ND110 that is associated with the term "<person>". Namely, the information processing apparatus 100 extracts the term that is associated with the nodes ND located in a region from the four nodes ND101 to ND104 included in the graph information ON11 up to the node ND110 that is associated with the term "<person>" as the information related to the class of the term "<Jim>" (Step S33).

In the example illustrated in FIG. 12, because it is possible to reach the node ND110 from the nodes ND103 and ND104, the nodes ND included in a region from the nodes ND103 and ND104 to the node ND110 become the target nodes to be extracted as the information related to the class of the term "<Jim>". Specifically, the eight nodes ND of the nodes ND103, ND104 and ND108 to ND113 become the target nodes to be extracted as the information related to the class of the term "<Jim>". Furthermore, in the example illustrated in FIG. 12, the information processing apparatus 100 extracts, as the calculation target of the statistical information, the classes down to the second highest classes from the node ND110 associated with the term "<person>" that is the top level concept.

Namely, in the example illustrated in FIG. 12, the information processing apparatus 100 extracts the term associated with the five nodes ND of the nodes ND108 to ND110, ND112, and ND113 as the calculation target of the statistical information. Furthermore, the node ND extracted as being associated with the subject of the target triple information is sometimes referred to as a "first element". Specifically, the information processing apparatus 100 uses the five terms, i.e., the term "<officer>" associated with the node ND108, the term "<owner>" associated with a node ND109, the term "<person>" associated with the node ND110, the term "<engineer>" associated with a node ND112, and the term "<employee>" associated with the node ND113, as the calculation targets of the statistical information.

Furthermore, in the example illustrated in FIG. 12, because it is not possible to reach the node ND110 from the nodes ND101 and ND102, the nodes ND101 and ND102 and the nodes ND105 to ND107, which are associated with the classes of the higher level of the node ND102, are not extracted as the information related to the class of the term "<Jim>". Furthermore, in the graph information ON11, the node associated with the class in a higher level than that of the node ND110 that is associated with the term "<person>" may also be included.

Furthermore, for example, as indicated by the ontology information storage unit 123-2 illustrated in FIG. 12, the ontology information TID102 indicates that the subject is "<worksAt>". Furthermore, for example, the ontology information TID102 indicates that the predicate is "rdfs:range", i.e., a predetermined property that indicates the range. In this case, the predicate "rdfs:range" indicates the class that can be the object of "<worksAt>". Furthermore, for example, the ontology information TID102 indicates that the object is "<organization>", i.e., an organization. Namely, the ontology information TID102 indicates that the classes lower than the class "<organization>" can become the object of "<worksAt>". Namely, it is indicated that, as the object of "<worksAt>", the term "<organization>" is the top level concept. Furthermore, a plurality of pieces of the ontology information in which the subject is "<worksAt>" and the predicate is "rdfs:range", i.e., a plurality of pieces of the ontology information indicating the range of "<worksAt>", may also be present.

Consequently, the information processing apparatus 100 decides the region of a search performed starting from the four nodes ND201 to ND204 in the graph information ON21 is up to a node ND207 associated with the term "<organization>". Namely, the information processing apparatus 100 extracts the term associated with the node ND located in a region between the four nodes ND201 to ND204 and the node ND207 associated with the term "<organization>" inclusive in the graph information ON21 as the information related to the class of "<HOGE.inc>" (Step S34).

In the example illustrated in FIG. 12, because it is possible to reach the node ND207 from the node ND201, the nodes ND included in a region between the node ND201 and the node ND207 inclusive become the target nodes to be extracted as the information related to the class of the term "<organization>". Specifically, the four nodes ND of the node ND201, ND205 to ND207 become the target nodes to be extracted as the information related to the class of the term "<organization>". Furthermore, in the example illustrated in FIG. 12, the information processing apparatus 100 extracts, as the calculation target of the statistical information, the classes down to the second highest classes from the node ND207 associated with the term "<organization>" that is the top level concept.

Namely, in the example illustrated in FIG. 12, the information processing apparatus 100 extracts the terms associated with the three nodes ND of the nodes ND205 to ND207 as the calculation target of the statistical information. Furthermore, the node ND extracted as being associated with the object in the target triple information is sometimes referred to as a "second element". Specifically, the information processing apparatus 100 uses the three terms, i.e., the term "<company limited>" associated with the node ND205, the term "<company>" associated with the node ND206, and the term "<organization>" associated with the node ND207, as the calculation target of the statistical information.

Furthermore, in the example illustrated in FIG. 12, because it is not possible to reach the node ND207 from the nodes ND202 to ND204, the nodes ND202 to ND204 and the nodes ND208 to ND211, which are associated with the classes of the higher level of the nodes ND202 to ND204, are not extracted as the information related to the class of the term "<organization>". Furthermore, in the graph information ON21, the node associated with the class higher than that of the node ND110 that is associated with the term "<organization>" may also be included.

Then, the information processing apparatus 100 extracts a combination that is based on the extracted first element and the extracted second element (Step S35). In the example illustrated in FIG. 12, the information processing apparatus 100 extracts the combination that is based on the nodes ND108 to ND110, ND112, and ND113, which are the first elements, and based on the nodes ND205 to ND207, which are the second elements. Specifically, the information processing apparatus 100 extracts the combination that can be obtained in a case where each of the first elements is treated as the subject, the term "<worksAt>" is treated as the predicate, and each of the second elements is treated as the object.

In the example illustrated in FIG. 12, the information processing apparatus 100 extracts the combination that can be obtained in a case where each of the terms associated with the five nodes of the nodes ND108 to ND110, ND112, and ND113 are treated as the subject, the term "<worksAt>" is treated as the predicate, and each of the terms associated with the three nodes of the nodes ND205 to ND207 is treated as the object. Namely, the information processing apparatus 100 extracts 15 (=5×3) types of combinations that are obtained in a case where each of the terms associated with the five nodes of the nodes ND108 to ND110, ND112, and ND113 is treated as the subject, the term "<worksAt>" is treated as the predicate, and each of the terms associated with the three nodes of the nodes ND205 to ND207 is treated as the object. In the example illustrated in FIG. 12, the information processing apparatus 100 extracts the combination indicated by the combination information CN21.

For example, as indicated by the combination information CN21, the information processing apparatus 100 extracts the combination in which the subject is "<person>", the predicate is "<worksAt>", and the object is "<organization>". Furthermore, for example, as indicated by the combination information CN21, the information processing apparatus 100 extracts the combination in which the subject is "<employee>", the predicate is "<worksAt>", and the object is "<organization>". Furthermore, the information processing apparatus 100 also extracts the remaining 13 types of combinations.

Then, the information processing apparatus 100 calculates the statistical information based on the extracted combination (Step S36). In the example illustrated in FIG. 12, the information processing apparatus 100 adds, based on the extracted combinations, the count value of each of the pieces of second triple information included in the second triple information storage unit 122. For example, the second triple information is the schema information indicating the conceptual classification structure based on the ontology information included in the ontology information storage unit 123. For example, the second triple information is the information indicating the semantic conceptual structure (graph structure) between the pieces of triple information based on the ontology information in the ontology information storage unit 123. Furthermore, extracting (generating) the second triple information will be described in detail later.

For example, the second triple information storage unit 122 illustrated in FIG. 12 is the same as the second triple information storage unit 122 illustrated in FIG. 6; therefore, descriptions thereof will be appropriately omitted.

In the example illustrated in FIG. 12, the information processing apparatus 100 increments the count value associated with the second triple information in the second triple information storage unit 122 associated with each of the combinations included in the combination information CN21 by 1.

For example, the information processing apparatus 100 increments the count value of the second triple information SID11 associated with the combination, in which the subject is "<person>", the predicate is "<worksAt>", and the object is "<organization>", included in the combination information CN21 by 1. In the example illustrated in FIG. 12, the information processing apparatus 100 increases the count value of the second triple information SID11 associated with the combination, in which the subject is "<person>", the predicate is "<worksAt>", and the object is "<organization>" in the combination information CN21 from "9999" to "10000".

Furthermore, for example, the information processing apparatus 100 increments the count value of the second triple information SID41 associated with the combination, in which the subject is "<engineer>", the predicate is "<worksAt>", and the object is "<company>", included in the combination information CN21 by 1. In the example illustrated in FIG. 12, the information processing apparatus 100 increases the count value of the second triple information SID41 associated with the combination, in which the subject is "<engineer>", the predicate is "<worksAt>", and the object is "<company>", in the combination information CN21 from "79" to "80".

By performing the process described above on each of the pieces of the first triple information stored in the first triple information storage unit 121, the information processing apparatus 100 calculates the statistical information related to the first triple information group stored in the first triple information storage unit 121. For example, by also performing the process described above on the first triple information FID21, in which subject is "<Jim>", the predicate is "<hasAge>", and the object is "32", the pieces of the first triple information FID201 and FID1105 (see FIG. 5), and the like, the information processing apparatus 100 calculates the statistical information related to the first triple information group stored in the first triple information storage unit 121. For example, regarding the second triple information in the hierarchy "0", the information processing apparatus 100 may also use the total value of the count values of the pieces of the second triple information in the hierarchy "1" as a count value.

As described above, the information processing apparatus 100 calculates the statistical information related to the first triple information based on the number of pieces of the first triple information associated with each of the pieces of the second triple information. In this way, by generating the statistical information indicating the tendency of the first triple information included in the first triple information group based on the second triple information related to a predetermined conceptual system, the information processing apparatus 100 can appropriately classify the triple information and efficiently use the triple information. Furthermore, the information processing apparatus 100 may also provide the generated statistical information to the terminal devices 10 (see FIG. 3). Furthermore, in the example described above, a case in which the predicate is "<worksAt>"" has been described as an example; however, if the ontology information related to the hierarchical structure, such as the higher level concept (higher level class), the lower level concept (lower level class), or the like, is present in the predicate, the information processing apparatus 100 may also calculate the statistical information by performing the same process as that described above on the predicate. For example, if the term "<belongsTo>" is defined as the higher level concept of the term "<worksAt>" that is the predicate and if, in addition to the term "<worksAt>", the term "<studiesAt>" (studies at) is defined as the lower level concept of the term "<belongsTo>", the information processing apparatus 100 may also calculate the statistical information based on this conceptual system. For example, regarding the term "<belongsTo>", the information processing apparatus 100 may also calculate the statistical information by calculating a count value based on the first triple information associated with the term "<worksAt>" or based on the first triple information associated with the term "<studiesAt>" each of which is the lower level concept.

5. Extracting the Second Triple Information

Figure 13:
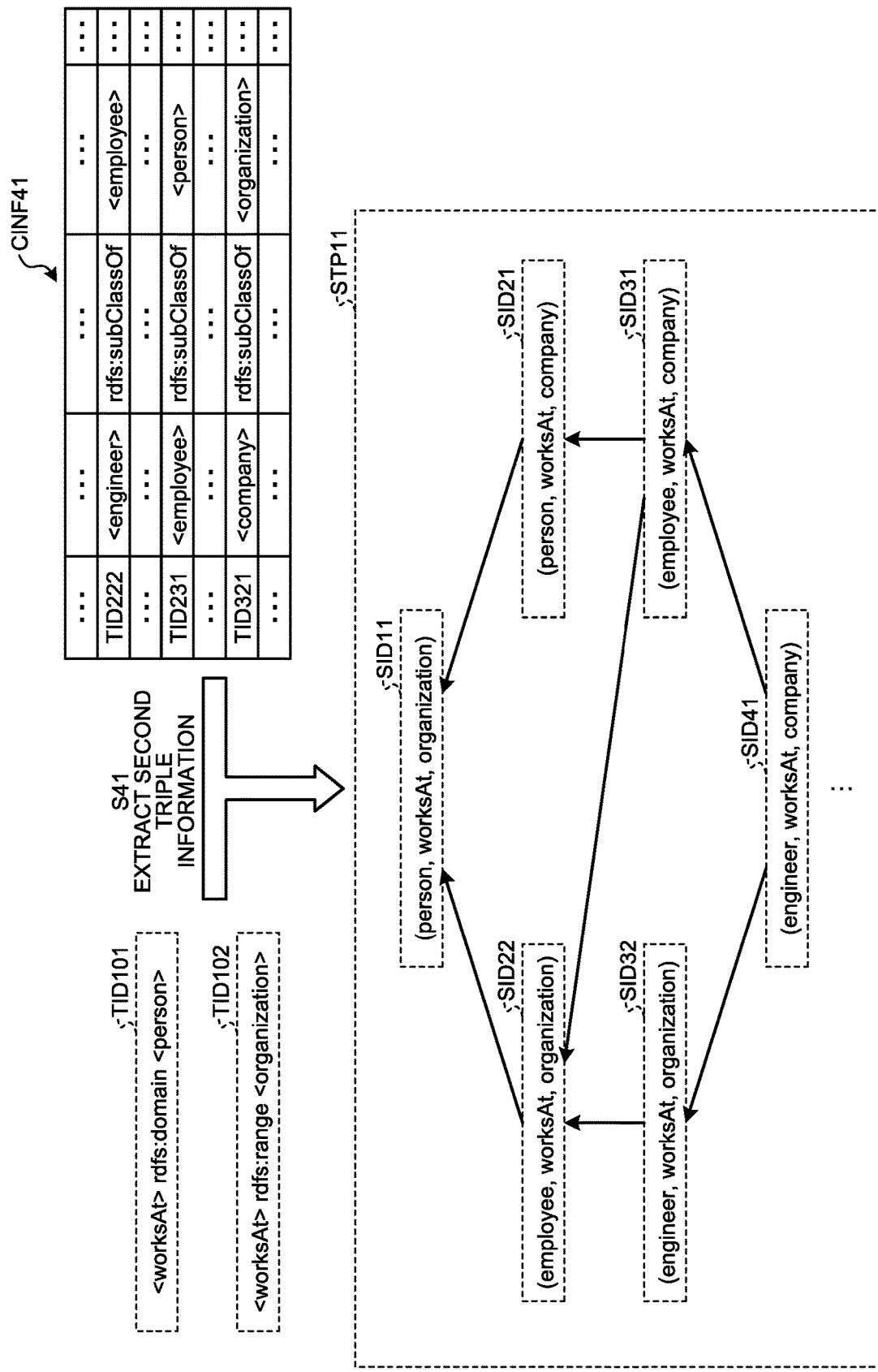
FIG. 13 is a diagram illustrating an example extracting the second triple information according to the embodiment.

For example, the information processing apparatus 100 may also extract the second triple information by appropriately using various sorts of information. This point will be described with reference to FIG. 13. FIG. 13 is a diagram illustrating an example of extracting the second triple information according to the embodiment. For example, the information processing apparatus 100 may also extract the second triple information based on the information stored in the ontology information storage unit 123.

FIG. 13 illustrates an example in which the second triple information is extracted based on the information stored in the ontology information storage unit 123 by using a case, as an example, where the predicate is "<worksAt>".

As illustrated in FIG. 13, the information processing apparatus 100 extracts the second triple information by using the information indicated by ontology information TID101 that indicates the domain of the predicate "<worksAt>", the ontology information TID102 that indicates the range of the predicate "<worksAt>", and the class information CINF41 (Step S41).

For example, regarding the subject of "<worksAt>", the information processing apparatus 100 specifies the subject in a case where the predicate is "<worksAt>" by using the ontology information TID101 indicating that the term "<person>" is the top level concept. For example, regarding the object of "<worksAt>", the information processing apparatus 100 specified the object in a case where the predicate is "<worksAt>" by using the ontology information TID102 indicating that the term "<organization>" is the top level concept.

Then, the information processing apparatus 100 specifies the lower level class (lower level concept) of the term "<person>" or the lower level class (lower level concept) of the term "<organization>" by using various sorts of information, such as the pieces of the ontology information TID222, TID231, TID321, and the like in each of which the predicate is "rdfs:subClassOf" indicated by the class information CINF41.

Then, the information processing apparatus 100 extracts the second triple information based on the information specified described above. In the example illustrated in FIG. 13, the information processing apparatus 100 extracts the second triple information having the hierarchical structure indicated by the schema triple information STP11.

The arrow line that links each of the pieces of the second triple information indicated by the schema triple information STP11 illustrated in FIG. 13 indicates that the pieces of the linked second triple information have the relationship of the higher level concept and the lower level concept. Specifically, the second triple information associated with the node on the side of the starting point of the arrow line indicates the lower level concept and the second triple information associated with the node on the side of the head of the arrow indicates the higher level concept. Furthermore, in FIG. 13, a description of "< >" will be appropriately omitted.

In the schema triple information STP11 illustrated in FIG. 13, the second triple information SID11 indicating the abstract meaning of "a person works at an organization" is located in the top level concept. The second triple information SID11 is associated with the term "<person>" that is the domain (domain) of "<worksAt>" defined in the ontology information TID101 and is associated with the term "<organization>" that is the range (range) of "<worksAt>" defined in the ontology information TID102.

Furthermore, in the schema triple information STP11 illustrated in FIG. 13, the second triple information SID21 in which the subject is "<person>", the predicate is "<worksAt>", and the object is "<company>" is located in the lower level concept of the second triple information SID11. In this way, in the lower level concept of the second triple information SID11, the second triple information SID21 in which the subject and the predicate are the same as those in the second triple information SID11 and the object is "<company>" that is the lower level class of "<organization>" is located.

Furthermore, in the schema triple information STP11 illustrated in FIG. 13, the second triple information SID22 in which the subject is "<employee>", the predicate is "<worksAt>", and the object is "<organization>" is located in the lower level concept of the second triple information SID11. In this way, in the lower level concept of the second triple information SID11, the second triple information SID22 in which the predicate and the object are the same as those in the second triple information SID11 and the subject is "<person>" that is the lower level class of "<employee>" is located. Furthermore, in FIG. 13, to simplify the description, only six pieces of the second triple information SID11, SID21, SID22, SID31, SID32, and SID41 are illustrated; however, a large number of pieces of the second triple information may also be included in the schema triple information STP11 illustrated in FIG. 13.

6. Flow of Information Processing

Figure 15:
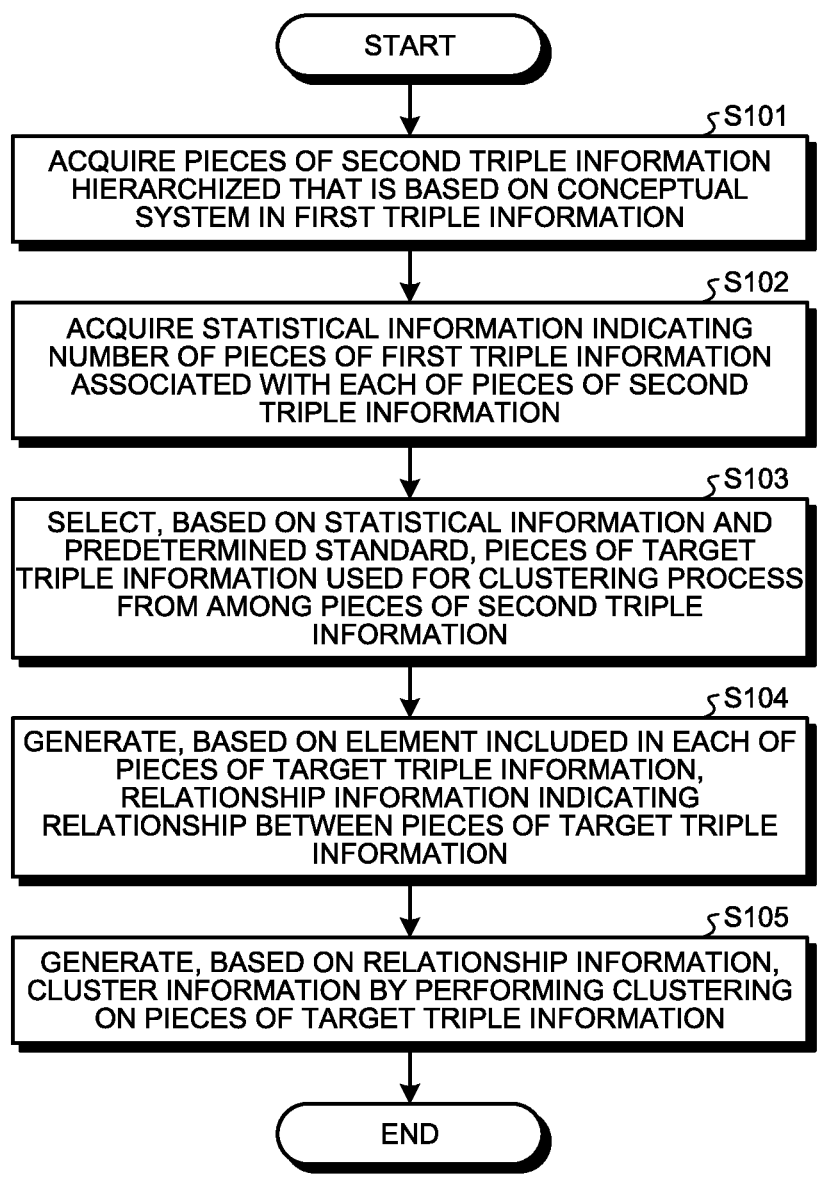
FIG. 15 is a flowchart illustrating an example of the information processing according to the embodiment.

In the following, the flow of the information processing performed by the information processing system 1 according to the embodiment will be described with reference to FIG. 15. FIG. 15 is a flowchart illustrating an example of the information processing according to the embodiment.

As illustrated in FIG. 15, the information processing apparatus 100 acquires a plurality of pieces of the second triple information that is hierarchized based on the conceptual system in the first triple information (Step S101). For example, the information processing apparatus 100 acquires a plurality of pieces of the second triple information from the second triple information storage unit 122. Furthermore, the information processing apparatus 100 acquires the statistical information indicating the number of pieces of the first triple information associated with each of the pieces of the second triple information (Step S102). For example, the information processing apparatus 100 acquires the statistical information from the second triple information storage unit 122.

Then, the information processing apparatus 100 selects, based on the statistical information and a predetermined standard, a plurality of pieces of target triple information used for the clustering process from among the plurality of pieces of the second triple information (Step S103). For example, as indicated by the target triple list SINF1, the information processing apparatus 100 selects, as the target triple information, the second triple information SID25, the second triple information SID31, the second triple information SID32, the second triple information SID55, and the like.

Then, the information processing apparatus 100 generates, based on the element included in each of the pieces of the target triple information, the relationship information indicating the relationship between the pieces of the target triple information (Step S104). For example, the information processing apparatus 100 calculates the distance between the pieces of the target triple information as the relationship information.

Then, the information processing apparatus 100 generates, based on the relationship information, the cluster information by performing clustering on the plurality of pieces of the target triple information (Step S105). For example, the information processing apparatus 100 generates the cluster information CLINF11 by performing clustering on the target triple information.

7. Flow of a Process of Selecting Target Triple Information

Figure 16:
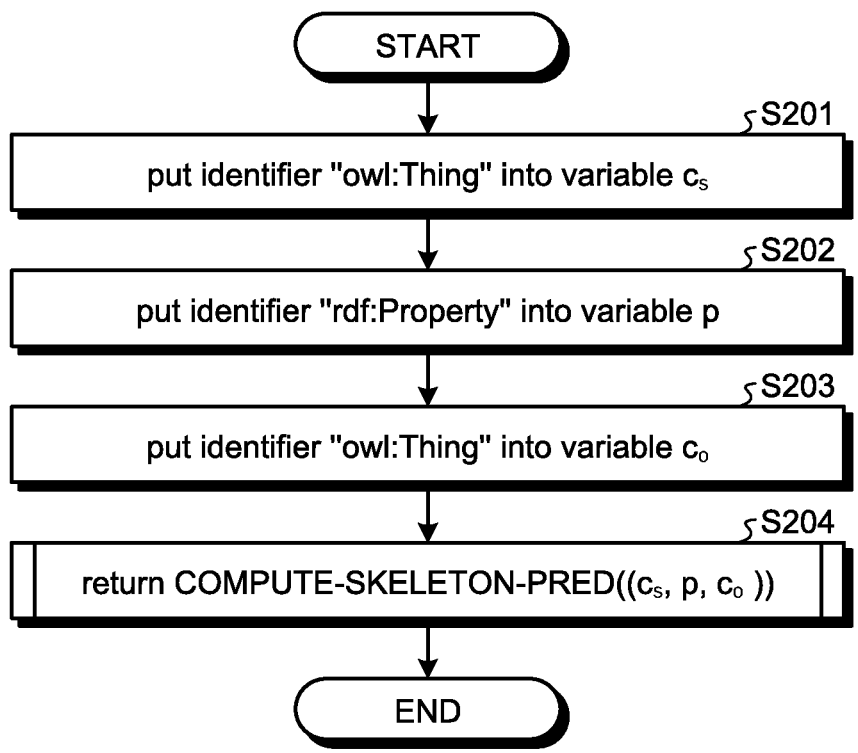
FIG. 16 is a flowchart illustrating an example of a selecting process according to the embodiment.
Figure 17:
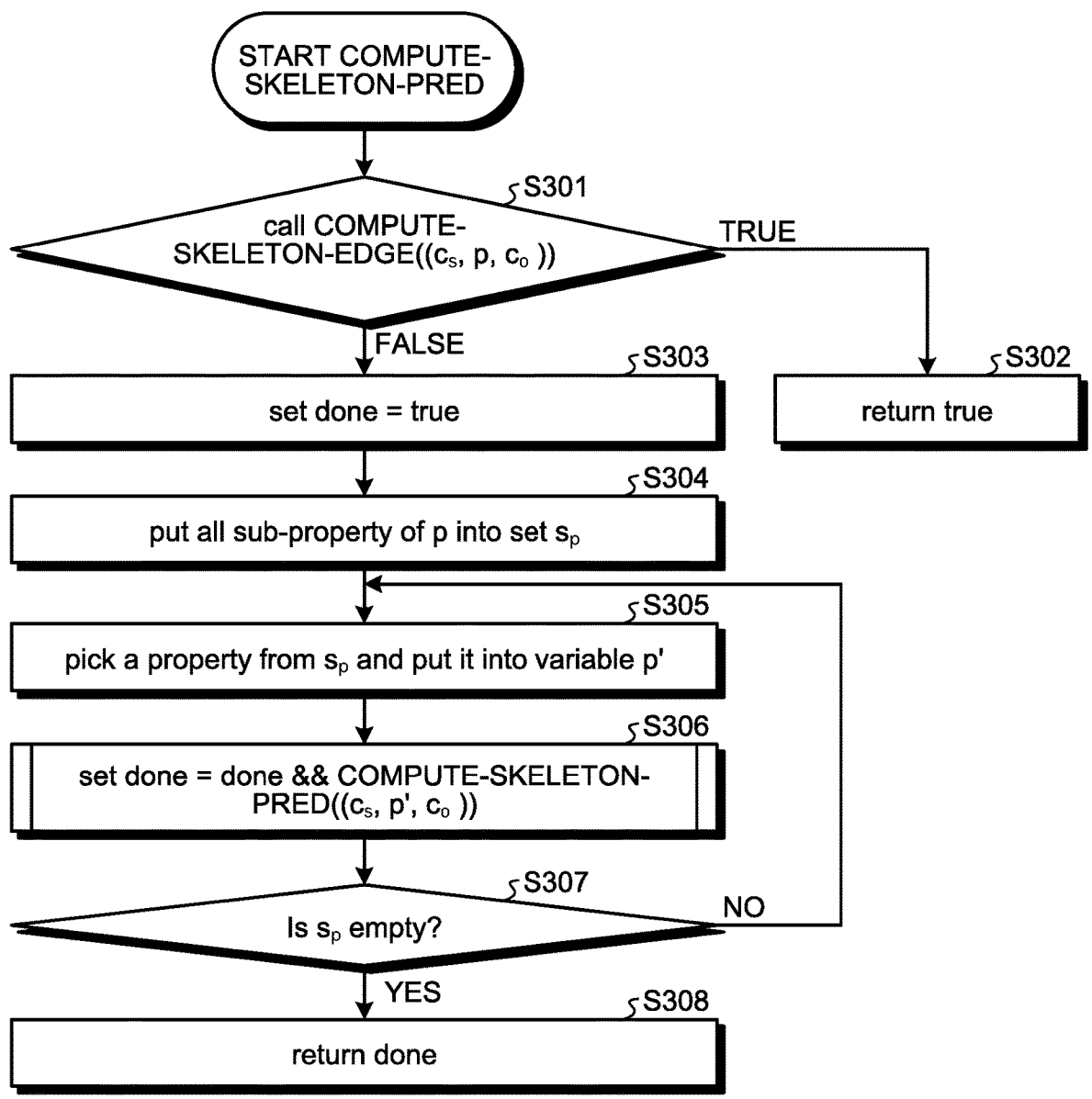
FIG. 17 is a flowchart illustrating an example of the selecting process according to the embodiment.
Figure 18:
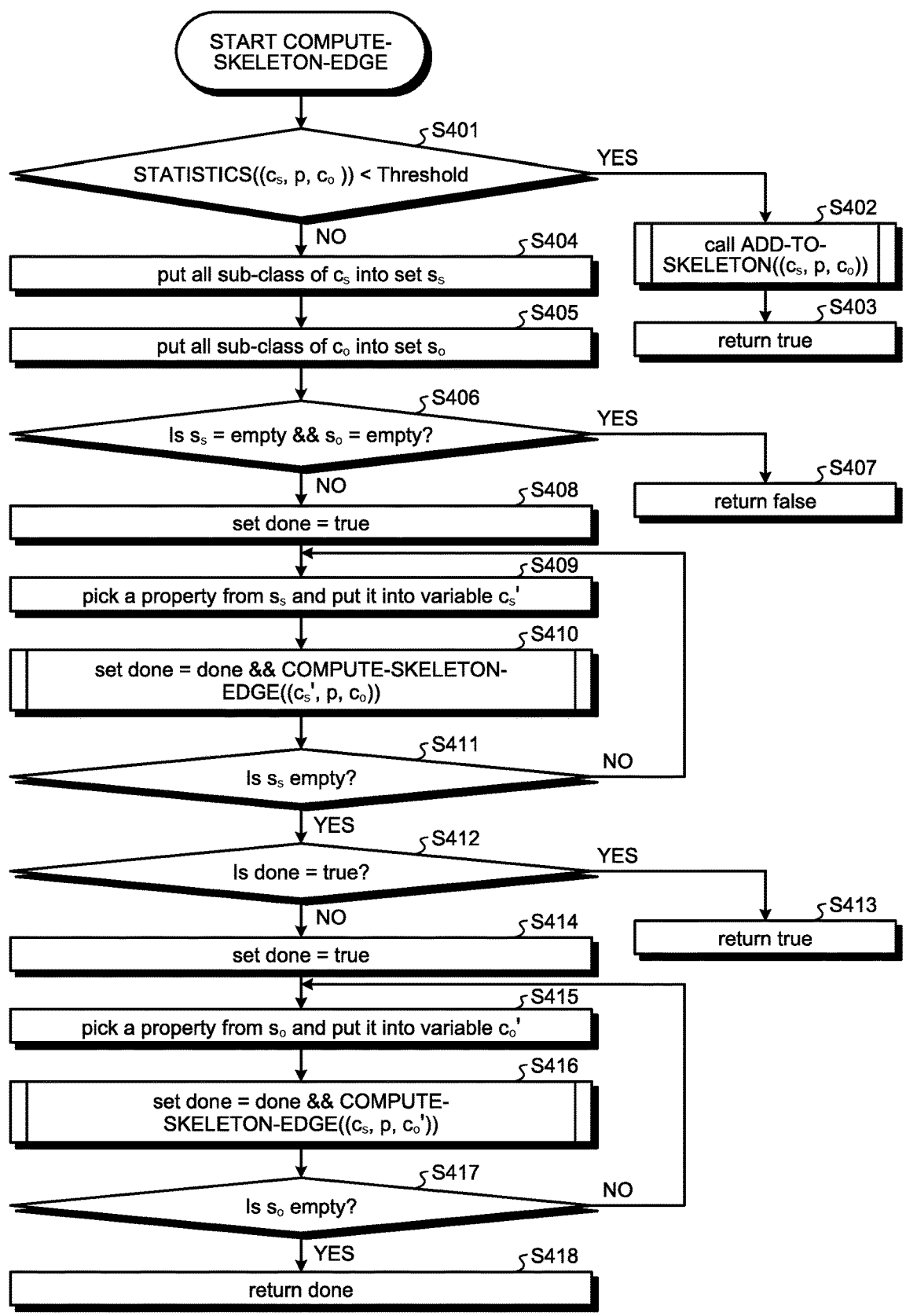
FIG. 18 is a flowchart illustrating an example of the selecting process according to the embodiment.

In the following, an example of the flow of a process of selecting the target triple information will be described with reference to FIG. 16 to FIG. 18. FIG. 16 to FIG. 18 are flowcharts each illustrating an example of a selecting process according to the embodiment. For example, the information processing apparatus 100 may also select the target triple information by executing a program (selection program) operated in the flow of the following process. Furthermore, the selecting process illustrated in FIG. 16 to FIG. 18 is an example and the information processing apparatus 100 may also perform the selecting process by using various algorithms.

As illustrated in FIG. 16, first, the information processing apparatus 100 puts 'owl:Thing' into a variable $c_s$ (Step S201). For example, the information processing apparatus 100 sets the concept of the top level hierarchy into the variable $c_s$ from among values associated with the subject. Furthermore, the information processing apparatus 100 puts 'rdf:Property' into a variable p (Step S202). For example, the information processing apparatus 100 sets the concept of the top level hierarchy into the variable p from among values associated with the subject. Furthermore, the information processing apparatus 100 puts 'owl:Thing' into a variable $c_o$ (Step S203). For example, the information processing apparatus 100 sets the concept of the top level hierarchy into the variable $c_o$ from among values associated with the object. Then, the information processing apparatus 100 executes a function COMPUTE-SKELETON-PRED in which the variables $c_s$, p, and $c_o$ are the arguments (Step S204). Then, the information processing apparatus 100 acquires the return value of the function COMPUTE-SKELETON-PRED and end the process.

As illustrated in FIG. 17, first, the information processing apparatus 100 performs, in the function COMPUTE-SKELETON-PRED, the function COMPUTE-SKELETON-EDGE in which the variables $c_s$, p, and $c_o$ are the arguments (Step S301). Then, if the return value of the function COMPUTE-SKELETON-EDGE is "true" (predetermined value or the like indicating true) (Yes at Step S301), the information processing apparatus 100 returns "true" as the return value (Step S302) and ends the process of the function COMPUTE-SKELETON-EDGE.

Furthermore, if the return value of the function COMPUTE-SKELETON-EDGE is "false" (predetermined value or the like indicating false) (No at Step S301), the information processing apparatus 100 sets "true" (predetermined value or the like indicating true) into a variable "done" (Step S303). Then, the information processing apparatus 100 puts all sub-property (lower level concept) of the predicate associated with the variable p into a set $s_p$ (Step S304). Then, the information processing apparatus 100 picks (selects) a single property (property) from the set $s_p$ and puts the property into the variable p' (Step S305).

Then, the information processing apparatus 100 sets "done" (predetermined value or the like indicating done) into the variable "done" and executes the function COMPUTE-SKELETON-PRED in which the variables $c_s$, p', and $c_o$ are the arguments (Step S306).

Then, if the set $s_p$ is not empty (No at Step S307), the information processing apparatus 100 returns to Step S305 and repeats the process. Furthermore, if the set $s_p$ is empty (Yes at Step S307), the information processing apparatus 100 returns the variable "done" as the return value (Step S308) and ends the process of the function COMPUTE-SKELETON-PRED.

As illustrated in FIG. 18, first, in the function COMPUTE-SKELETON-EDGE, the information processing apparatus 100 performs a function STATISTICS in which the variables $c_s$, p, and $c_o$ are the arguments (Step S401). For example, the function STATISTICS is a function that returns the statistical information of the triple information in which the value of the variable $c_s$ is the subject, the value of p is the predicate, and the value of $c_o$ is the object. The function STATISTICS is a function that returns the count value of the second triple information in which the value of the variable $c_s$ is the subject, the value of p is the predicate, and the value of $c_o$ is the object.

Then, if the return value of the function STATISTICS is less than the threshold (Yes at Step S401), the information processing apparatus 100 executes the function ADD-TO-SKELETON in which the variables $c_s$, p, and $c_o$ are the arguments (Step S402). For example, the function ADD-TO-SKELETON is a function for selecting, as the target triple information, the triple information in which the value of the variable $c_s$ is the subject, the value of p is the predicate, and the value of $c_o$ is the object. The function ADD-TO-SKELETON adds information (a flag, etc.) indicating that the second triple information, in which the value of the variable $c_s$ is the subject, the value of p is the predicate, and the value of $c_o$ is the object, has been selected as the target triple information. The function ADD-TO-SKELETON stores, in a predetermined storage area, the second triple information, in which the value of the variable $c_s$ is the subject, the value of p is the predicate, and the value of $c_o$ is the object, as the target triple information. Furthermore, any process may also be used for the process of the function ADD-TO-SKELETON as long as the information indicating that the associated triple information has been selected as the target triple information can be specified. Then, the information processing apparatus 100 returns "true" as the return value (Step S403) and ends the process of the function COMPUTE-SKELETON-EDGE.

Furthermore, if the return value of the function STATISTICS is not less than the threshold (No at Step S401), the information processing apparatus 100 puts all sub-classes (lower level concepts) of the subject associated with the variable $c_s$ into the set $s_s$ (Step S404). Furthermore, the information processing apparatus 100 puts all sub-classes (lower level concepts) of the object associated with the variable $c_o$ into the set $s_o$ (Step S405).

Then, if the set $s_s$ and the set $s_o$ are empty (Yes at Step S406), the information processing apparatus 100 returns "false" as the return value (Step S407) and ends the process of the function COMPUTE-SKELETON-EDGE.

Furthermore, if the set $s_s$ or the set $s_o$ are not empty (No at Step S406), the information processing apparatus 100 sets "true" into the variable "done" (Step S408).

Then, the information processing apparatus 100 picks (selects) a single property (property) from the set $s_s$ and sets the property into the variable $c_s'$ (Step S409).

Then, the information processing apparatus 100 sets "done" into the variable "done" and executes the function COMPUTE-SKELETON-EDGE in which the variables $c_s'$, p, and $c_o$ are the arguments (Step S410).

Then, if the set $s_s$ is not empty (No at Step S411), the information processing apparatus 100 returns to Step S409 and repeats the process. Furthermore, if the set $s_p$ is empty (Yes at Step S411), the information processing apparatus 100 determines whether the set variable "done" is "true" (Step S412).

If the variable "done" is "true" (Yes at Step S412), the information processing apparatus 100 returns "true" as the return value (Step S413) and ends the process of the function COMPUTE-SKELETON-EDGE.

Then, if the variable "done" is not "true" (Yes at Step S412), the information processing apparatus 100 sets "true" into the variable "done" (Step S414).

Then, the information processing apparatus 100 picks (selects) one of the properties (properties) from the set $s_o$ and puts the selected property into the variable $c_o'$ (Step S415).

Then, the information processing apparatus 100 sets "done" into the variable "done" and executes the function COMPUTE-SKELETON-EDGE in which the variables $c_s$, p, and $c_o'$ are the arguments (Step S416).

Then, if the set $s_o$ is not empty (No at Step S417), the information processing apparatus 100 returns to Step S415 and repeats the process. Furthermore, if the $s_o$ is empty (Yes at Step S417), the information processing apparatus 100 returns the variable "done" as the return value (Step S418) and ends the process of the function COMPUTE-SKELETON-EDGE.

8. Effects

As described above, the information processing apparatus 100 according to the embodiment includes the acquiring unit 131 and the selecting unit 132. The acquiring unit 131 acquires a plurality of pieces of second triple information hierarchized based on a conceptual system in a plurality of pieces of first triple information indicating a relationship related to three types of elements and statistical information indicating the number of pieces of the first triple information associated with each of the pieces of the second triple information. The selecting unit 132 selects, based on the statistical information acquired by the acquiring unit 131 and based on a predetermined standard related to the statistical information, from among the plurality of pieces of the second triple information, a plurality of pieces of target triple information to be used for a clustering process.

Consequently, the information processing apparatus 100 according to the embodiment can appropriately classify and efficiently use the triple information by selecting, based on the statistical information and based on the predetermined standard related to the statistical information, from among the plurality of pieces of the second triple information, the plurality of pieces of the target triple information to be used for the clustering process.

Furthermore, in the information processing apparatus 100 according to the embodiment, the selecting unit 132 selects the plurality of pieces of the target triple information based on a comparison between the statistical information of each of the plurality of pieces of the second triple information and a predetermined threshold that is the predetermined standard.

Consequently, the information processing apparatus 100 according to the embodiment can appropriately classify and efficiently use the triple information by selecting the plurality of pieces of the target triple information based on the comparison between the statistical information of each of the plurality of pieces of the second triple information and the predetermined threshold that is the predetermined standard.

Furthermore, in the information processing apparatus 100 according to the embodiment, the selecting unit 132 selects the plurality of pieces of the target triple information based on the predetermined threshold that is calculated from a value related to each of the number of plurality of pieces of the first triple information and the number of clusters.

Consequently, the information processing apparatus 100 according to the embodiment can appropriately classify and efficiently use the triple information by selecting the plurality of pieces of the target triple information based on the predetermined threshold that is calculated from the value related to the number of plurality of pieces of the first triple information and the number of clusters.

Furthermore, in the information processing apparatus 100 according to the embodiment, when the statistical information of one of the pieces of the second triple information is less than the predetermined threshold and when the statistical information of one of the other pieces of the second triple information in a hierarchy of a higher level concept that is higher than that of the one of the pieces of the second triple information is equal to or greater than the predetermined threshold, the selecting unit 132 selects the one of the pieces of the second triple information as the target triple information.

Consequently, the information processing apparatus 100 according to the embodiment can appropriately classify and efficiently use the triple information by selecting, when a certain piece of the triple information satisfies a condition and when one of the other pieces of the second triple information in the hierarchy of the higher level concept that is higher than that of the certain piece of the triple information does not satisfy the condition, the certain triple information as the target triple information.

Furthermore, in the information processing apparatus 100 according to the embodiment, when the statistical information of one of the pieces of the second triple information is less than the predetermined threshold and when the statistical information of one of the other pieces of the second triple information that is directly linked to a node of the one of the pieces of the second triple information is equal to or greater than the predetermined threshold, the selecting unit 132 selects the one of the pieces of the second triple information as the target triple information.

Consequently, the information processing apparatus 100 according to the embodiment can appropriately classify and efficiently use the triple information by selecting, when a certain piece of the triple information satisfies a condition and when one of the other pieces of the second triple information in one hierarchy above the certain piece of the triple information does not satisfy the condition, the certain triple information as the target triple information.

Furthermore, the information processing apparatus 100 according to the embodiment has the generating unit 133. The generating unit 133 generates, based on the elements included in each of the pieces of the target triple information selected by the selecting unit 132, relationship information indicating a relationship between the pieces of the target triple information.

Consequently, the information processing apparatus 100 according to the embodiment can appropriately classify and efficiently use the triple information by generating, based on the elements included in each of the pieces of the selected target triple information, the relationship information indicating the relationship between the pieces of the target triple information.

Furthermore, in the information processing apparatus 100 according to the embodiment, the generating unit 133 generates the relationship information based on commonality of the elements included in each of the pieces of the target triple information.

Consequently, the information processing apparatus 100 according to the embodiment can appropriately classify and efficiently use the triple information by generating the relationship information based on the commonality of the elements included in each of the pieces of the target triple information.

Furthermore, in the information processing apparatus 100 according to the embodiment, the generating unit 133 generates the relationship information based on the statistical information of each of the pieces of the target triple information.

Consequently, the information processing apparatus 100 according to the embodiment can appropriately classify and efficiently use the triple information by generating the relationship information based on the statistical information of each of the plurality of pieces of the target triple information.

Furthermore, in the information processing apparatus 100 according to the embodiment, the generating unit 133 generates, as the relationship information, the information related to the distance between the pieces of the target triple information.

Consequently, the information processing apparatus 100 according to the embodiment can appropriately classify and efficiently use the triple information by generating, as the relationship information, the information related to the distance between the pieces of the target triple information.

Furthermore, in the information processing apparatus 100 according to the embodiment, the generating unit 133 generates, based on the relationship information, cluster information by performing clustering on the plurality of pieces of the target triple information.

Consequently, the information processing apparatus 100 according to the embodiment can appropriately classify and efficiently use the triple information by generating, based on the relationship information, cluster information by performing clustering on the plurality of pieces of the target triple information.

Furthermore, in the information processing apparatus 100 according to the embodiment, the generating unit 133 generates the cluster information such that the pieces of the target triple information having a closer relationship that is based on the relationship information are subjected to clustering into a same cluster.

Consequently, the information processing apparatus 100 according to the embodiment can appropriately classify and efficiently use the triple information by generating the cluster information such that the pieces of target triple information having a closer relationship that is based on the relationship information are subjected to clustering into the same cluster.

Furthermore, in the information processing apparatus 100 according to the embodiment, the generating unit 133 generates the relationship information based on graph information that includes, from among the three types of elements in the plurality of pieces of the target triple information, nodes each of which indicates a predetermined type of element and edges each of which links the nodes.

Consequently, the information processing apparatus 100 according to the embodiment can appropriately classify and efficiently use the triple information by generating the relationship information based on graph information that includes nodes each of which indicates a predetermined type of element from among the three types of elements in the plurality of pieces of the target triple information and edges each of which links the nodes.

Furthermore, in the information processing apparatus 100 according to the embodiment, the generating unit 133 generates the relationship information based on the graph information in which, from among the three types of elements in the plurality of pieces of the target triple information, the element of a subject or an object is used as the node and the element of a predicate is used as the edge.

Consequently, the information processing apparatus 100 according to the embodiment can appropriately classify and efficiently use the triple information by generating relationship information based on the graph information in which, from among the three types of elements in the plurality of pieces of the target triple information, the element of a subject or an object is used as a node and the element of a predicate is used as the edge.

Furthermore, in the information processing apparatus 100 according to the embodiment, the generating unit 133 generates the relationship information based on the graph information in which the node associated with the subject included in one of the pieces of the target triple information and the node associated with the object included in the one of the pieces of the target triple information are linked by the edge that is associated with the predicate included in the one of the pieces of the target triple information.

Consequently, the information processing apparatus 100 according to the embodiment can appropriately classify and efficiently use the triple information by generating the relationship information based on the graph information in which the node associated with the subject included in one of the pieces of the target triple information and the node associated with the object included in the one of the pieces of the target triple information are linked by the edge that is associated with the predicate included in the one of the pieces of the target triple information.

Furthermore, in the information processing apparatus 100 according to the embodiment, the generating unit 133 generates the relationship information based on the graph information that includes the other edges each of which links the nodes that are associated with the elements having a predetermined conceptual relationship.

Consequently, the information processing apparatus 100 according to the embodiment can appropriately classify and efficiently use the triple information by generating the relationship information based on the graph information that includes the other edges each of which links the nodes that are associated with the elements having a predetermined conceptual relationship.

Furthermore, in the information processing apparatus 100 according to the embodiment, the generating unit 133 generates the relationship information based on the graph information that includes the other edges each of which links the nodes that are associated with the elements having a higher level/lower level conceptual relationship.

Consequently, the information processing apparatus 100 according to the embodiment can appropriately classify and efficiently use the triple information by generating the relationship information based on the graph information that includes the other edges each of which links the nodes that are associated with the elements having a higher level/lower level conceptual relationship.

Furthermore, in the information processing apparatus 100 according to the embodiment, the generating unit 133 generates, based on a link relationship between first target triple information and second target triple information, the relationship information indicating the relationship between the first target triple information and the second target triple information.

Consequently, the information processing apparatus 100 according to the embodiment can appropriately classify and efficiently use the triple information by generating, based on a link relationship between first target triple information and second target triple information, the relationship information indicating the relationship between the first target triple information and the second target triple information.

Furthermore, in the information processing apparatus 100 according to the embodiment, the generating unit 133 generates the relationship information based on the other pieces of the target triple information that are included in a route in which the number of edges included between the first target triple information and the second target triple information is the minimum.

Consequently, the information processing apparatus 100 according to the embodiment can appropriately classify and efficiently use the triple information by generating the relationship information based on the other pieces of the target triple information that are included in a route in which the number of edges included between the first target triple information and the second target triple information is the minimum.

Furthermore, in the information processing apparatus 100 according to the embodiment, the generating unit 133 generates the relationship information based on the statistical information of the first target triple information, the statistical information of the second target triple information, and the statistical information of the other pieces of the target triple information.

Consequently, the information processing apparatus 100 according to the embodiment can appropriately classify and efficiently use the triple information by generating the relationship information based on the statistical information of the first target triple information, the statistical information of the second target triple information, and the statistical information of the other pieces of the target triple information.

Furthermore, in the information processing apparatus 100 according to the embodiment, the generating unit 133 generates the relationship information based on the number of pieces of the other pieces of the target triple information.

Consequently, the information processing apparatus 100 according to the embodiment can appropriately classify and efficiently use the triple information by generating the relationship information based on the number of pieces of the other pieces of the target triple information.

Furthermore, the information processing apparatus 100 according to the embodiment includes the providing unit 134. The providing unit 134 provides information that is based on the plurality of pieces of the target triple information selected by the selecting unit 132.

Consequently, the information processing apparatus 100 according to the embodiment can appropriately classify and efficiently use the triple information by providing information that is based on the plurality of pieces of the selected target triple information.

9. Hardware Configuration

Figure 19:
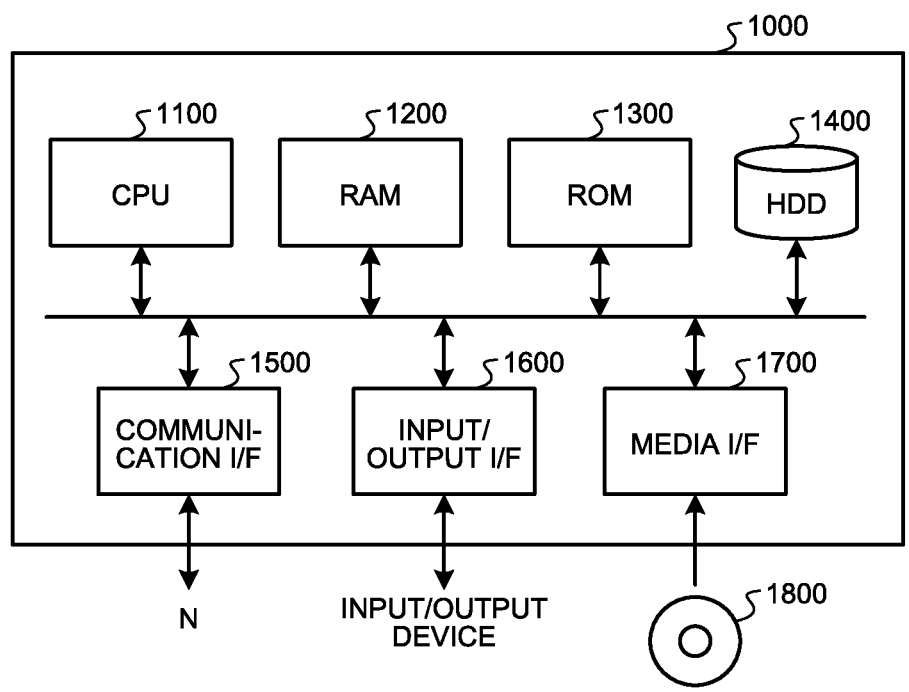
FIG. 19 is a diagram of hardware configuration illustrating an example of a computer that implements the function of the information processing apparatus.

The information processing apparatus 100 according to the embodiment described above is implemented by, for example, a computer 1000 having the configuration illustrated in FIG. 19. FIG. 19 is a diagram of hardware configuration illustrating an example of the computer that implements the function of the information processing apparatus. The computer 1000 includes a CPU 1100, a RAM 1200, a read only memory (ROM) 1300, a hard disk drive (HDD) 1400, a communication interface (I/F) 1500, an input/output interface (I/F) 1600, and a media interface (I/F) 1700.

The CPU 1100 is operated based on the programs stored in the ROM 1300 or the HDD 1400 and performs control of each of the units. The ROM 1300 stores therein a boot program executed by the CPU 1100 at the startup of the computer 1000, programs depending on the hardware of the computer 1000, or the like.

The HDD 1400 stores therein programs executed by the CPU 1100, data used by the programs, and the like. The communication interface 1500 receives data from another device via the network N, sends the data to the CPU 1100, and sends the data generated by the CPU 1100 to the other devices via the network N.

The CPU 1100 controls, via the input/output interface 1600; an output device, such as a display, a printer, or the like; and an input device, such as a keyboard, a mouse, or the like. The CPU 1100 acquires data from the input device via the input/output interface 1600. Furthermore, the CPU 1100 outputs the generated data to the output device via the input/output interface 1600.

The media interface 1700 reads a program or data stored in a recording medium 1800 and provides the program or the data to the CPU 1100 via the RAM 1200. The CPU 1100 loads the program into the RAM 1200 from the recording medium 1800 via the media interface 1700 and executes the loaded program. The recording medium 1800 is, for example, an optical recording medium, such as a digital versatile disc (DVD), a phase change rewritable disk (PD), or the like, a magneto optical recording medium, such as a magneto-optical disk (MO), or the like, a tape medium, a magnetic recording medium, a semiconductor memory, or the like.

For example, when the computer 1000 functions as the information processing apparatus 100 according to the embodiment, the CPU 1100 in the computer 1000 implements the function of the control unit 130 by executing the program loaded into the RAM 1200. The CPU 1100 in the computer 1000 reads and executes the programs from the recording medium 1800; however, as another example, the programs may also be acquired from another device via the network N.

In the above, embodiments of the present application have been described in detail based on the drawings; however the embodiments are described only by way of an example. In addition to the embodiments described in disclosure of invention, the present invention can be implemented in a mode in which various modifications and changes are made in accordance with the knowledge of those skilled in the art.

10. Others

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, the processes described in the embodiment may appropriately be combined as long as the processes do not conflict with each other.

Furthermore, the "components (sections, modules, units)" described above can be read as "means", "circuits", or the like. For example, an acquiring unit can be read as an acquiring means or an acquiring circuit.

According to an aspect of an embodiment, an advantage is provided in that it is possible to appropriately classify and efficiently use triple information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a processor programmed to:
acquire a plurality of pieces of second triple information hierarchized based on a conceptual system in a plurality of pieces of first triple information indicating a relationship about three types of elements;
acquire statistical information indicating an integer total number of pieces of the first triple information associated with each of the pieces of the second triple information; and
select, based on the statistical information acquired by the processor and based on a predetermined threshold for the integer total number of pieces of the first triple information, from among the plurality of pieces of the second triple information, a plurality of pieces of target triple information to be used for a clustering process,
wherein, when the statistical information of one of the pieces of the second triple information is less than the predetermined threshold and when the statistical information of one of the other pieces of the second triple information in a hierarchy of a higher level concept that is higher than that of the one of the pieces of the second triple information is equal to or greater than the predetermined threshold, the processor is programmed to select the one of the pieces of the second triple information as the target triple information.

2. The information processing apparatus according to claim 1, wherein the predetermined threshold is calculated from a value related to each of the integer total number of plurality of pieces of the first triple information and the number of clusters.

3. The information processing apparatus according to claim 1, wherein, when the statistical information of one of the pieces of the second triple information is less than the predetermined threshold and when the statistical information of one of the other pieces of the second triple information that is directly linked to a node of the one of the pieces of the second triple information is equal to or greater than the predetermined threshold, the processor is programmed to select the one of the pieces of the second triple information as the target triple information.

4. The information processing apparatus according to claim 1, wherein the processor is programmed to generate, based on the elements included in each of the pieces of the target triple information selected by the processor, relationship information indicating a relationship between the pieces of the target triple information.

5. The information processing apparatus according to claim 4, wherein the processor is programmed to generate the relationship information based on commonality of the elements included in each of the pieces of the target triple information.

6. The information processing apparatus according to claim 4, wherein the processor is programmed to generate the relationship information based on the statistical information of each of the pieces of the target triple information.

7. The information processing apparatus according to claim 4, wherein the processor is programmed to generate, as the relationship information, information related to a distance between the pieces of the target triple information.

8. The information processing apparatus according to claim 4, wherein the processor is programmed to generate, based on the relationship information, cluster information by performing clustering on the plurality of pieces of the target triple information.

9. The information processing apparatus according to claim 8, wherein the processor is programmed to generate the cluster information such that the pieces of the target triple information having a closer relationship that is based on the relationship information are subjected to clustering into a same cluster.

10. The information processing apparatus according to claim 4, wherein the processor is programmed to generate the relationship information based on graph information that includes, from among the three types of elements in the plurality of pieces of the target triple information, nodes each of which indicates a predetermined type of element and edges each of which links the nodes.

11. The information processing apparatus according to claim 10, wherein the processor is programmed to generate the relationship information based on the graph information in which, from among the three types of elements in the plurality of pieces of the target triple information, the element of a subject or an object is used as the node and the element of a predicate is used as the edge.

12. The information processing apparatus according to claim 11, wherein the processor is programmed to generate the relationship information based on the graph information in which the node associated with the subject in one of the pieces of the target triple information and the node associated with the object in the one of the pieces of the target triple information are linked by the edge that is associated with the predicate in the one of the pieces of the target triple information.

13. The information processing apparatus according to claim 10, wherein the processor is programmed to generate the relationship information based on the graph information that includes the other edges each of which links the nodes that are associated with the elements having a predetermined conceptual relationship.

14. The information processing apparatus according to claim 13, wherein the processor is programmed to generate the relationship information based on the graph information that includes the other edges each of which links the nodes that are associated with the elements having a higher/lower level conceptual relationship.

15. The information processing apparatus according to claim 10, wherein the processor is programmed to generate, based on a link relationship between first target triple information and second target triple information, the relationship information indicating the relationship between the first target triple information and the second target triple information.

16. The information processing apparatus according to claim 15, wherein the processor is programmed to generate the relationship information based on the other pieces of the target triple information that are included in a route in which a number of edges included between the first target triple information and the second target triple information is the minimum.

17. The information processing apparatus according to claim 16, wherein the processor is programmed to generate the relationship information based on the statistical information of the first target triple information, the statistical information of the second target triple information, and the statistical information of the other pieces of the target triple information.

18. The information processing apparatus according to claim 16, wherein the processor is programmed to generate the relationship information based on the number of pieces of the other pieces of the target triple information.

19. The information processing apparatus according to claim 1, wherein the processor is programmed to select the plurality of pieces of target triple information to be used for the clustering process by searching the hierarchized second triple information initially from a top-most level hierarchy and sequentially searching along a downward direction.

20. An information processing method performed by a computer comprising:
   acquiring, a plurality of pieces of second triple information hierarchized based on a conceptual system in a plurality of pieces of first triple information indicating a relationship about three types of elements and statistical information indicating an integer total number of pieces of the first triple information associated with each of the pieces of the second triple information; and
   selecting, based on the statistical information acquired at the acquiring and based on a predetermined threshold for the integer total number of pieces of the first triple information, from among the plurality of pieces of the second triple information, a plurality of pieces of target triple information to be used for a clustering process, and
   wherein, when the statistical information of one of the pieces of the second triple information is less than the predetermined threshold and when the statistical information of one of the other pieces of the second triple information in a hierarchy of a higher level concept that is higher than that of the one of the pieces of the second triple information is equal to or greater than the predetermined threshold, the selecting includes selecting the one of the pieces of the second triple information as the target triple information.

21. A non-transitory computer-readable recording medium having stored therein an information processing program that causes a computer to execute a process comprising:
- acquiring a plurality of pieces of second triple information hierarchized based on a conceptual system in a plurality of pieces of first triple information indicating a relationship about three types of elements and statistical information indicating an integer total number of pieces of the first triple information associated with each of the pieces of the second triple information; and
- selecting, based on the statistical information acquired at the acquiring and based on a predetermined threshold for the integer total number of pieces of the first triple information, from among the plurality of pieces of the second triple information, a plurality of pieces of target triple information to be used for a clustering process, and
- wherein, when the statistical information of one of the pieces of the second triple information is less than the predetermined threshold and when the statistical information of one of the other pieces of the second triple information in a hierarchy of a higher level concept that is higher than that of the one of the pieces of the second triple information is equal to or greater than the predetermined threshold, the selecting includes selecting the one of the pieces of the second triple information as the target triple information.

* * * * *